(12) United States Patent
Sugihara et al.

(10) Patent No.: US 8,777,406 B2
(45) Date of Patent: Jul. 15, 2014

(54) DEVICE-MOUNTING SUPPORT MEMBER

(75) Inventors: Ryohei Sugihara, Machida (JP); Seiji Tatsuta, Hachioji (JP); Yoichi Iba, Hachioji (JP)

(73) Assignee: Olympus Corporation, Tokyo (JP)

( * ) Notice: Subject to any disclaimer, the term of this patent is extended or adjusted under 35 U.S.C. 154(b) by 235 days.

(21) Appl. No.: 13/249,533

(22) Filed: Sep. 30, 2011

(65) Prior Publication Data
US 2012/0081658 A1 Apr. 5, 2012

(30) Foreign Application Priority Data

Oct. 1, 2010 (JP) .................................. 2010-224171
Oct. 1, 2010 (JP) .................................. 2010-224176
Oct. 1, 2010 (JP) .................................. 2010-224207

(51) Int. Cl.
*G02C 1/00* (2006.01)
(52) U.S. Cl.
USPC ........................................................ 351/158
(58) Field of Classification Search
CPC .................... G02B 2027/0178; G02B 27/017; G02B 2027/0138; G06F 3/013; G06F 1/163; G06F 3/012; G02C 11/10; G02C 11/04
USPC .......... 351/158, 121; 359/630, 631, 633, 638; 345/7, 8
See application file for complete search history.

(56) References Cited

U.S. PATENT DOCUMENTS

| | | | |
|---|---|---|---|
| 3,769,663 A | 11/1973 | Perl | |
| 4,753,514 A | 6/1988 | Kubik | |
| 6,356,392 B1 * | 3/2002 | Spitzer | ........................ 359/630 |
| 8,523,352 B2 | 9/2013 | Jannard et al. | |
| 2007/0008484 A1 | 1/2007 | Jannard | |
| 2010/0245754 A1 | 9/2010 | Matsumoto et al. | |

FOREIGN PATENT DOCUMENTS

| | | |
|---|---|---|
| CN | 101156104 A | 4/2008 |
| EP | 2 237 099 A2 | 10/2010 |
| JP | 2001-522064 | 11/2001 |
| JP | 2008-244658 | 10/2008 |
| JP | 2008-545287 A | 12/2008 |
| WO | 2008/117705 A1 | 10/2008 |

OTHER PUBLICATIONS

Abstract of International Publication No. WO 9923525 A1, dated May 14, 1999.

(Continued)

*Primary Examiner* — Hung Dang
(74) *Attorney, Agent, or Firm* — Scully, Scott, Murphy & Presser, P.C.

(57) ABSTRACT

Provided is a device-mounting support member (100) for mounting a wearable device (W) onto an eyeglass frame, including: an eyeglass attachment portion (101) having a first pressing portion (101a) to be pressed against a temple portion (T) of the eyeglass frame; a support frame portion (102) to be attached with the wearable device (W) which extends from the eyeglass attachment portion (101) substantially parallel to the temple portion (T); and a head abutment portion (103) which is coupled to the support frame portion (102) and to be abutted to a head of a wearer, in which: the support frame portion (102) is arranged on the outside of the temple portion (T); the head abutment portion (103) is arranged on the inside of the temple portion (T); and the support frame portion (102) and the head abutment portion (103) are coupled to each other via a support bridge portion (104).

17 Claims, 24 Drawing Sheets

(56) References Cited

OTHER PUBLICATIONS

European Patent Convention Communication dated Aug. 2, 2013, from corresponding European Application No. 11 183 492.5.
Notice of Reasons for Rejection dated Dec. 3, 2013 from related Japanese Application No. 2010-224171, together with an English language translation.

English abstract only of Great Britain Application No. GB 2426140.
European Partial Search Report dated May 11, 2012 from corresponding European Patent Application No. EP 11 18 3492.5.
Chinese Office Action dated Dec. 19, 2013 from related Chinese Application No. 201110294710.6, together with a partial English language translation.

* cited by examiner

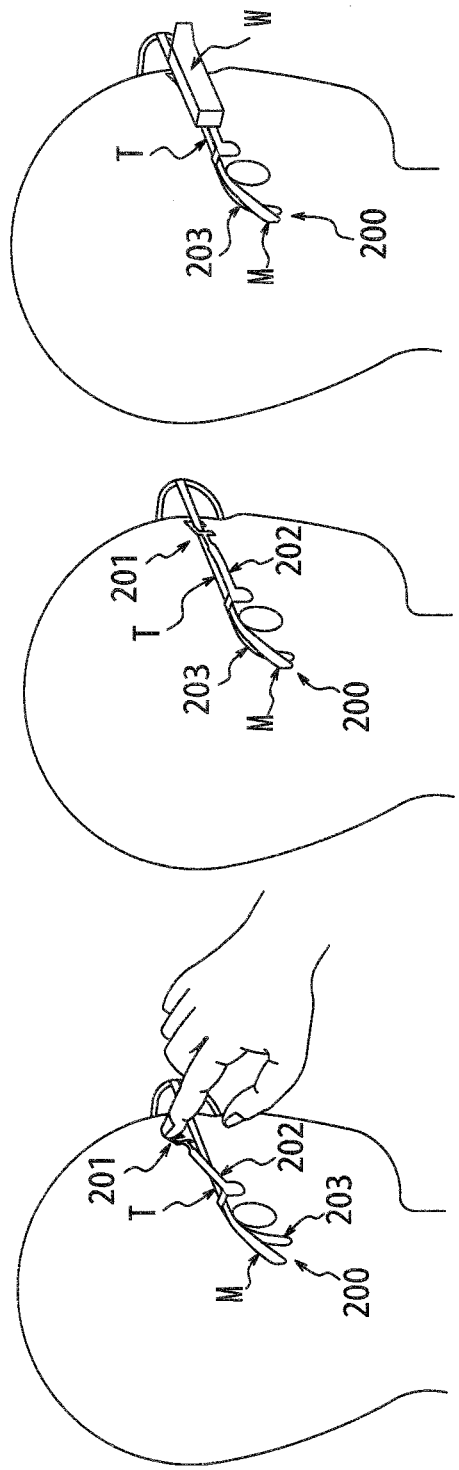

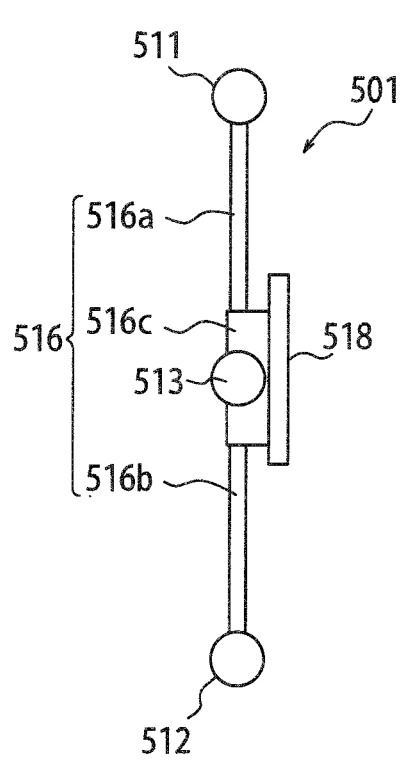
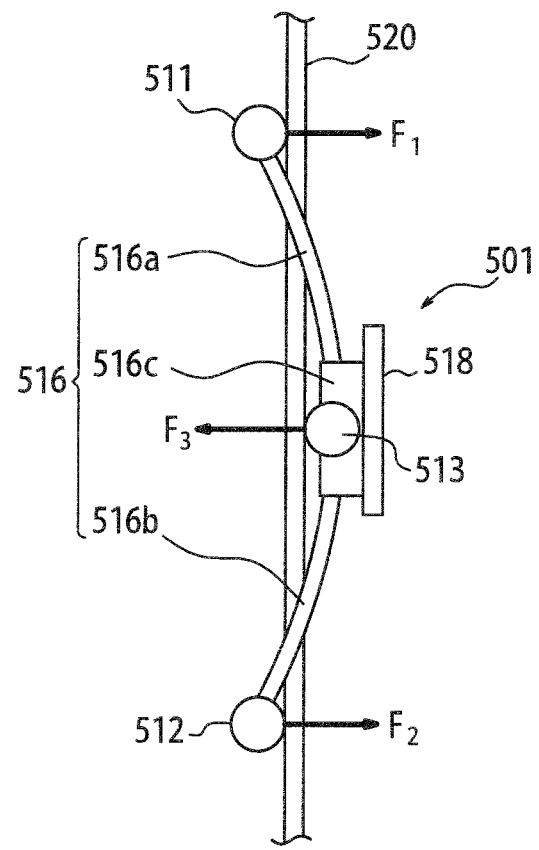

DEVICE-MOUNTING SUPPORT MEMBER

TECHNICAL FIELD

The present application claims priority from Japanese Applications No. 2010-224207, No. 2010-224171 and No. 2010-224176, filed on Oct. 1, 2010, the content of which are incorporated herein by reference.

TECHNICAL FIELD

The present invention relates to a device-mounting support member, and more particularly to a support member for mounting a wearable device to an eyeglass frame.

RELATED ART

In recent years, an image display device or a small camera that is mountable on an eyeglass frame has been proposed as a wearable device. As a method of mounting such a wearable device on an eyeglass frame, the following methods are known. That is, for example, as disclosed in U.S. Pat. No. 4,753,514 A, there is known a method in which a device is provided with a clip so as to clamp an eyeglass frame by the clip, to thereby mount the device. There is known another method, as disclosed in JP 2001-522064 A, in which the device is screwed to an eyeglass frame, to thereby mount the device. Further, there is also disclosed a device-mounting support member, in which a device to be mounted is provided with a clip portion, so as to clamp the lens by the clip portion, to thereby hold the device (see, for example, JP 2008-244658 A).

DISCLOSURE OF THE INVENTION

Some aspects of the present invention reside in configurations as follows.

(1) A device-mounting support member for mounting a wearable device onto an eyeglass frame, including: an eyeglass attachment portion having a first pressing portion to be pressed against a temple of the eyeglass frame; a support frame portion to be attached with the wearable device, the support frame portion extending from the eyeglass attachment portion substantially parallel to the temple of the eyeglass frame; and a head abutment portion which is coupled to the support frame portion and to be abutted to a head of a wearer, in which: the support frame portion is arranged on the outside of the temple of the eyeglass frame; the head abutment portion is arranged on the inside of the temple of the eyeglass frame and prevents rotation about the temple; and the support frame portion and the head abutment portion are coupled to each other via a support bridge portion that straddles the temple of the eyeglass frame.

(2) The device-mounting support member according to the above-mentioned item (1), in which: the head abutment portion has a pivot point portion that comes into contact with the temple of the eyeglass frame; and the head abutment portion is pushed out to the outside by the head of the wearer, when the eyeglass frame attached with the support member is worn by the wearer, so that the first pressing portion is pressed against the temple of the eyeglass frame from the outside to the inside of the temple with the pivot point portion serving as a pivot.

(3) The device-mounting support member according to the above-mentioned item (2), in which: the first pressing portion and/or the pivot point portion are in a shape that follows a side surface shape of the temple of the eyeglass frame.

(4) The device-mounting support member according to the above-mentioned item (1), in which: the first pressing portion of the eyeglass attachment portion is arranged on the inside of the temple of the eyeglass frame; the head abutment portion has a second pressing portion to be pressed against the inside of the temple of the eyeglass frame; the eyeglass attachment portion further has an outside attachment portion coupled to the support frame portion and arranged on the outside of the temple of the eyeglass frame and an attachment bridge portion for coupling the first pressing portion and the outside attachment portion across the temple of the eyeglass frame; the support frame portion exerts an elastic force, when the support member is attached to the eyeglass frame, so as to cause the first pressing portion to be pressed against the temple from the inside to the outside of the temple of the eyeglass frame, and the second pressing portion to be pressed against the temple from the inside to the outside of the temple of the eyeglass frame.

(5) The device-mounting support member according the above-mentioned item (1), in which: the first pressing portion of the eyeglass attachment portion is arranged on the inside of the temple of the eyeglass frame; the head abutment portion has a second pressing portion to be pressed against the inside of the temple of the eyeglass frame; the eyeglass attachment portion further has an outside attachment portion coupled to the support frame portion and arranged on the outside of the temple of the eyeglass frame, and an attachment bridge portion for coupling, across the temple of the eyeglass frame, the first pressing portion to one of the outside attachment portion and the support frame portion; the attachment bridge portion exerts an elastic force, when the support member is attached to the eyeglass frame, so as to cause the first pressing portion to be pressed against the temple from the inside to the outside of the temple of the eyeglass frame.

(6) The device-mounting support member according to the above-mentioned item (4), in which the first pressing portion and/or the second pressing portion are in a shape that follows a side surface shape of the temple of the eyeglass frame.

(7) The device-mounting support member according to the above-mentioned item (4), in which the attachment bridge portion straddles above the temple of the eyeglass frame.

(8) The device-mounting support member according the above-mentioned item (1), further including a movement prevention portion for preventing the device-mounting support member from moving in one of a vertical direction and a lateral direction when the support member is attached to the eyeglass frame.

(9) The device-mounting support member according to the above-mentioned item (1), in which the head abutment portion has a leading end portion curved to the inside of the temple of the eyeglass frame, the leading end portion being branched or bent in a plurality of directions along the head of the wearer.

(10) The device-mounting support member according to the above-mentioned item (1), in which the support bridge portion straddles above the temple of the eyeglass frame.

(11) The device-mounting support member according to the above-mentioned item (1), in which the support frame portion has coupling means for attaching the wearable device so that the wearable device is made adjustable in posture thereof.

(12) The device-mounting support member according to the above-mentioned item (11), in which the coupling means has a mechanism capable of rotating the wearable device in at least one of a pitch direction and a roll direction with respect to the extending direction of the temple of the eyeglass frame.

(13) The device-mounting support member according to the above-mentioned item (4), in which the attachment bridge portion directly couples the first pressing portion and the outside attachment portion to each other across the temple of the eyeglass frame.

(14) The device-mounting support member according to the above-mentioned item (1), in which the head abutment portion is an ear hook portion to be hooked onto an ear of the wearer.

(15) The device-mounting support member according to the above-mentioned item (14), in which the support frame portion is arranged between the eyeglass attachment portion and the ear hook portion.

(16) The device-mounting support member according to the above-mentioned item (14), in which: the first pressing portion of the eyeglass attachment portion is arranged on the inside of the temple of the eyeglass frame; the eyeglass attachment portion has an outside attachment portion coupled to the support frame portion and arranged on the outside of the temple of the eyeglass frame and an attachment bridge portion for coupling the first pressing portion to one of the outside attachment portion and the support frame portion; and the support frame portion is arranged on the outside of the temple of the eyeglass frame.

(17) The device-mounting support member according to the above-mentioned item (16), in which: the support frame portion exerts an elastic force, when the support member is attached to the eyeglass frame, so as to cause the first pressing portion to be pressed against the temple from the inside to the outside of the temple of the eyeglass frame and the ear hook portion to be pressed against the temple from the inside to the outside of the temple of the eyeglass frame.

(18) A device-mounting support member, including: at least three contact portions including a first contact portion, a second contact portion, and a third contact portion; a coupling portion for coupling the first contact portion, the second contact portion, and the third contact portion to one another; and a device attachment portion provided to one of the coupling portion and the contact portion, for attaching a device; in which, when attached to an eyeglass temple, the third contact portion is arranged, in a direction along the eyeglass temple, between the first contact portion and the second contact portion, the coupling portion has a spring property at least in part thereof, and the spring property causes the first contact portion, the second contact portion, and the third contact portion to elastically abut to side surfaces of the eyeglass temple, the first contact portion and the second contact portion being arranged on an opposite side to the third contact portion across the eyeglass temple.

(19) The device-mounting support member according to the above-mentioned item (18), in which the coupling portion extends, when attached to an eyeglass temple, along the eyeglass temple.

(20) The device-mounting support member according to the above-mentioned item (18), in which the coupling portion directly couples the first contact portion and the third contact portion to each other, and the distance between the first contact portion and the third contact portion is twice as large as a width of the eyeglass temple clamped between the first contact portion and the third contact portion and between the second contact portion and the third contact portion.

(21) The device-mounting support member according to the above-mentioned item (18), in which the coupling portion directly couples the first contact portion and the second contact portion to each other, and also couples the third contact portion and one of the first contact portion, the second contact portion and a portion therebetween to each other.

(22) The device-mounting support member according to the above-mentioned item (18), in which the coupling portion attached to the eyeglass temple extends, in part that has the spring property, in an extending direction of the eyeglass temple in a position at substantially the same height as the eyeglass temple when viewed laterally.

(23) The device-mounting support member according to the above-mentioned item (18), in which: the coupling portion attached to the eyeglass temple extends, in the part that has a spring property, in an extending direction of the eyeglass temple on one of an upper side and a lower side of the eyeglass temple, when viewed laterally; and at least one of the first contact portion, the second contact portion, and the third contact portion has a canopy portion at an end thereof, which is opposite in the vertical direction to the part having the spring property with respect to the eyeglass temple, so as to restrict the movement with respect to the eyeglass temple.

(24) The device-mounting support member according to the above-mentioned item (18), in which: the coupling member includes a torsion spring, in the part that has the spring property, between the first contact portion and the third contact portion and between the second contact portion and the third contact portion; and the first contact portion, the second contact portion, and the third contact portion are caused to elastically abut to both sides of the eyeglass temple due to a torsion moment about a central axis of the torsions spring.

(25) The device-mounting support member according to the above-mentioned item (18), in which: the coupling portion couples, when attached to the eyeglass temple, between the first contact portion and the third contact portion and between the second contact portion and the third contact portion, across the eyeglass temple, on one of the upper side and the lower side of the eyeglass temple so as to be arranged on different sides from each other.

(26) The device-mounting support member according to the above-mentioned item (18), in which: the contact portions each have, when attached to the eyeglass temple, a width of 5 mm to 200 mm in a vertical direction with respect to the extending direction of the eyeglass temple.

(27) The device-mounting support member according to the above-mentioned item (18), in which the device attachment portion includes an adjustment mechanism for adjusting an attachment posture of a device to be attached to the device attachment portion, with respect to the device attachment portion.

(28) The device-mounting support member according to the above-mentioned item (18), in which at least one of the contact portions has, when attached to an eyeglass temple, a shape that follows an abutment surface with respect to the eyeglass temple.

(29) The device-mounting support member according to the above-mentioned item (18), in which: the coupling portion attached to an eyeglass temple abuts to the eyeglass temple at least at one point thereof; and the coupling portion has an abutment surface with respect to the eyeglass temple which forms an acute angle, when viewed in a direction along the eyeglass temple, with respect to an abutment surface formed between any one of the contact portions coupled by the coupling portion and the eyeglass temple.

(30) The device-mounting support member according to the above-mentioned item (18), in which: the coupling portion includes a first coupling portion for coupling the first contact portion and the third contact portion to each other, and a second coupling portion for coupling the second contact portion and the third contact portion to each other; the first coupling portion attached to the eyeglass temple is shorter than the second coupling portion in a direction along the eyeglass temple; and the part that has a sprint property is arranged in the vicinity of the third contact portion of the second coupling portion.

(31) The device-mounting support member according to the above-mentioned item (18), further including a fourth contact portion located behind the second contact portion when attached to the eyeglass temple, in which: the coupling portion includes a first coupling member for directly coupling between the first contact portion and the second contact portion and a second coupling member for directly coupling between the third contact portion and the fourth contact portion, the second coupling member having a spring property; the first coupling member and the second coupling member are coupled to each other via a rotary coupling member having a rotation axis in substantially a vertical direction when attached to eyeglass temple; the fourth contact portion is elastically abutted to a side surface of the eyeglass temple, on the same side as the third contact portion; and a length of the second coupling member, along the eyeglass temple, between the rotary coupling portion and the third contact portion is smaller than a length of the second coupling member, along the eyeglass temple, between the rotary coupling portion and the fourth contact portion.

(32) The device-mounting support member according to the above-mentioned item (31), in which: the first coupling member couples between the first contact portion and the second contact portion; and the second coupling member is coupled to the third contact portion and to the fourth contact portion across the eyeglass temple on one of the upper side and the lower side thereof in one of front and back of the rotary coupling portion, respectively.

(33) The device-mounting support member according to the above-mentioned item (32), in which the second coupling member intersects with the eyeglass temple as being tilted forward, between the rotary coupling portion and the third contact portion, when viewed vertically.

BRIEF DESCRIPTION OF THE DRAWINGS

FIGS. 8A to 8C are views illustrating an example of a method of attaching, to an eyeglass frame, the device-mounting support member according to the second embodiment of the present invention;

FIGS. 14A and 14B are schematic diagrams for illustrating a structure of a device-mounting support member according to a fifth embodiment of the present invention;

BEST MODES FOR CARRYING OUT THE INVENTION

In the following, embodiments of a device-mounting support member according to the present invention are described with reference to the accompanying drawings. In the following description, unless otherwise specified, directions such as front, back, above, below, vertical, and horizontal, are defined in a state where eyeglasses having the device-mounting support member attached to a temple portion (eyeglass temple) of an eyeglass frame is mounted on the head of a user. Further, in a state where the eyeglasses are thus mounted, the head side of the eyeglass temple is referred to as inside while the other side thereof is referred to as outside.

First Embodiment

Figure 1A:
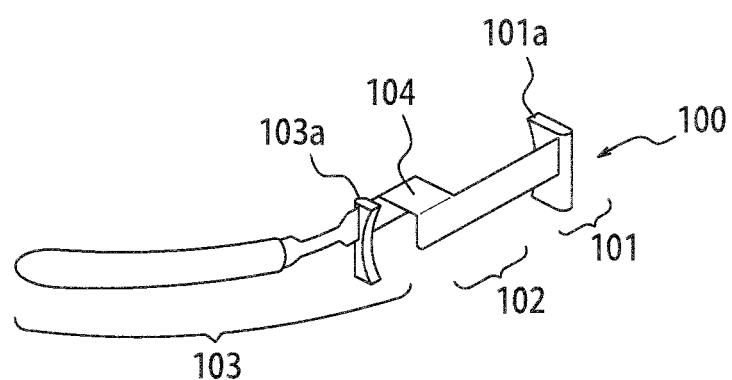
FIGS. 1A and 1B are views schematically illustrating a device-mounting support member according to a first embodiment of the present invention.
Figure 1B:
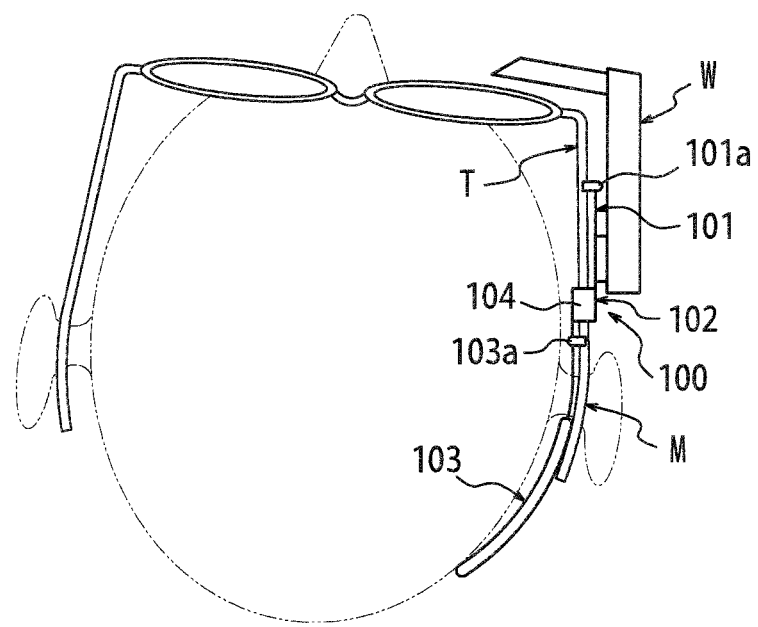

FIG. 1A is a perspective view schematically illustrating a device-mounting support member 100 according to a first embodiment of the present invention, and FIG. 1B is a plan view schematically illustrating the device-mounting support member 100 of FIG. 1A attached with a wearable device W, which is attached to an eyeglass frame and worn by a wearer. In the following embodiments, the wearable device W is exemplified by a head-mounted image display device.

In FIGS. 1A and 1B, the device-mounting support member 100 includes: an eyeglass attachment portion 101 having a first pressing portion 101a to be pressed against a temple portion T of an eyeglass frame; a support frame portion 102 for having the wearable device W attached thereto, the support frame portion 102 extending substantially parallel to the temple portion T of the eyeglass frame from the eyeglass attachment portion 101; and a head abutment portion 103 coupled to the support frame portion 102 so as to be abutted to the head of the wearer. With the aid of the eyeglass attachment portion 101 and the head abutment portion 103, the device-mounting support member 100 can be attached with ease. At the same time, the device-mounting support member 100 is fixed at two points, namely, at the eyeglasses and at the wearer, so as to be stably fixed. In particular, the eyeglass attachment portion 101 defines the attachment position with respect to the wearer, while the head abutment portion 103 prevents the device from falling off and rotating with respect to the temple of the eyeglasses.

As illustrated in FIG. 1B, the support frame portion 102 is arranged on the outside of the temple portion T of the eyeglass frame, while the head abutment portion 103 is arranged on the inside of the temple portion T of the eyeglass frame and curved in a direction along the head shape, that is, curved to the inside of the temple portion T of the eyeglass frame. The support frame portion 102 and the head abutment portion 103 are coupled to each other via a support bridge portion 104 that straddles the temple portion T of the eyeglass frame. In FIGS. 1A and 1B, the support bridge portion 104 straddles above the temple portion T of the eyeglass frame. This configuration can reliably prevent the device-mounting support member 100 from being moved downward by gravity.

In FIGS. 1A and 1B, the head abutment portion 103 has a pivot point portion 103a that comes into contact with the temple portion T of the eyeglass frame, so as to be configured in such a manner that the head abutment portion 103 is pushed out to the outside by the head of the wearer, to thereby produce an action of pressing the first pressing portion 101a in the inside direction from the outside of the temple portion T of the eyeglass frame, with the pivot point portion 103a serving as a pivot. With this configuration, the first pressing portion 101a and the pivot point portion 103a each generate a frictional force with respect to the temple portion T, so that the device-mounting support member 100 can be prevented from being displaced in any of the directions including a vertical direction, a lateral direction, and an anteroposterior direction.

Further, the head abutment portion 103 is curved in a direction drawing away from the temple portion T of the eyeglass frame, that is, curved to the inside of the temple portion T of the eyeglass frame in a direction along the head of the wearer, which also generates a friction force between the head abutment portion 103 and the head of the wearer, so that the device-mounting support member 100 can also be prevented from being rotated about an axis along the temple portion T of the eyeglass frame.

Figure 2A:
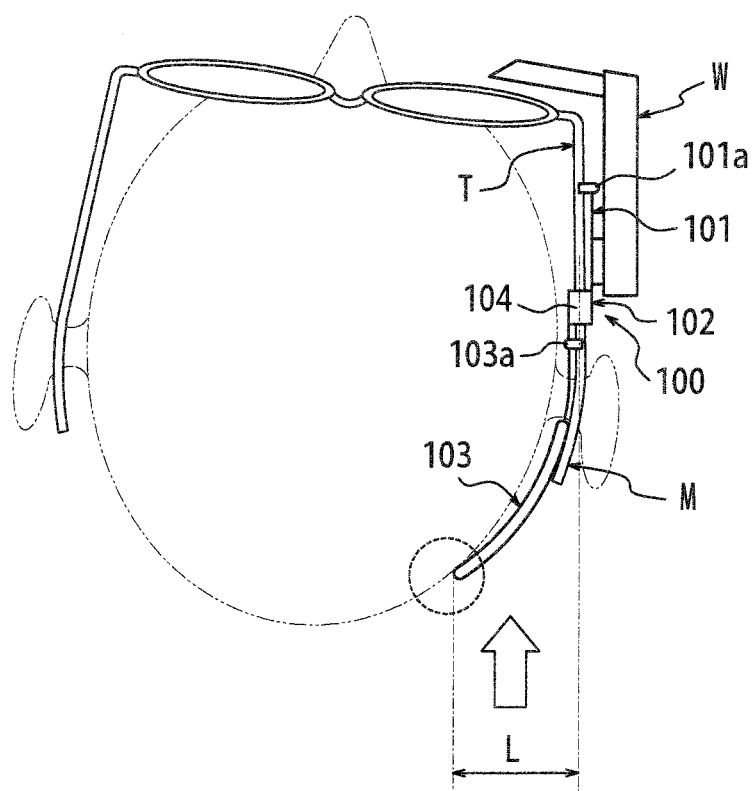
FIGS. 2A and 2B are views for illustrating an action of a head abutment portion of the device-mounting support member according to the first embodiment of the present invention.
Figure 2B:
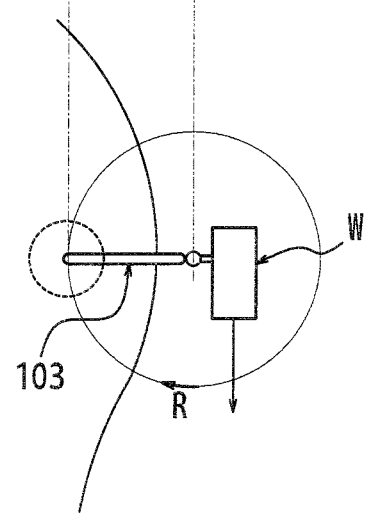

FIGS. 2A and 2B are views for illustrating an action of the head abutment portion 103 of the device-mounting support member 100 described above, in which: FIG. 2A is a plan view schematically illustrating the support member 100 attached with the wearable device W, which is attached to an eyeglass frame and worn by a wearer; and FIG. 2B is a back view of the support member 100 of FIG. 2A viewed from behind the head of the wearer.

As illustrated in FIG. 2B, the device-mounting support member 100 is subjected to a force rotating in a clockwise direction due to the self weight of the wearable device W. However, the head abutment portion 103 is clamped between the head of the wearer and an end cover portion M of the eyeglass frame so as to generate a friction force, which prevents a rotation R indicated by the arrow in the drawing. In order to further increase the friction force, the head abutment portion 103 is configured to extend longer in the posterior direction of the wearer along the head. Such a configuration allows the device-mounting support member 100 to be stably latched onto the temple portion T of the eyeglass frame and onto the head of the wearer.

Further, as illustrated in FIG. 1A, the first pressing portion 101a and/or the pivot point portion 103a may be formed in a shape that follows the side surface shape of the temple portion T of the eyeglass frame, for example, formed in a shape concave on the temple side, so as to more reliably prevent the device-mounting support member 100 from being displaced in the vertical direction.

Figure 3A:
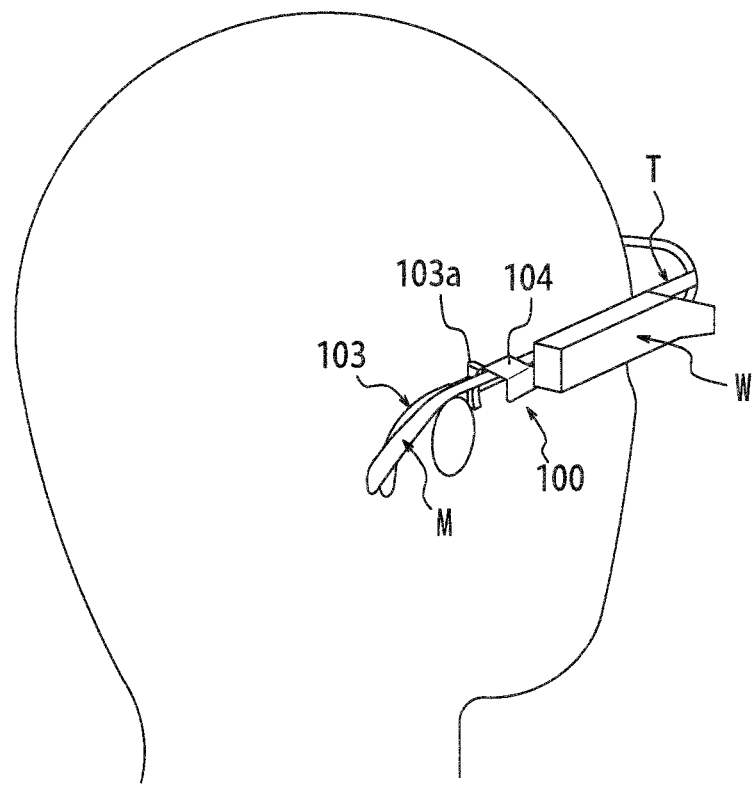
FIGS. 3A and 3B are views for illustrating an action of another head abutment portion of the device-mounting support member according to the first embodiment of the present invention.
Figure 3B:
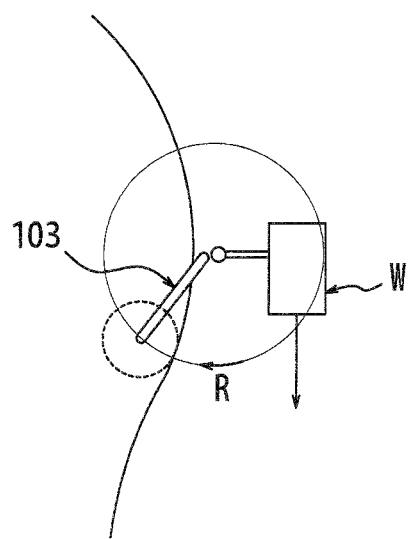

FIGS. 3A and 3B are views for illustrating an action of a head abutment portion of another modified example of the device-mounting support member 100 described above, in which: FIG. 3A is a plan view schematically illustrating the device-mounting support member 100 which is attached to the eyeglass frame and worn by the wearer; and FIG. 3B is a back view of the support member 100 of FIG. 3A viewed from behind the head of the wearer.

In the example illustrated in FIGS. 3A and 3B, the head abutment portion 103 is curved backward along the head of the wearer and is also curved downward, so as to more effectively prevent the rotation R indicated by the arrow in the drawing. This is because the above-mentioned rotation R is in the direction which causes the head abutment portion 103 to bite into the head, that is, in the direction which causes physical interference between the head and the head abutment portion 103, and hence the rotation of the device-mounting support member 100 can be prevented highly effectively.

Figure 4A:
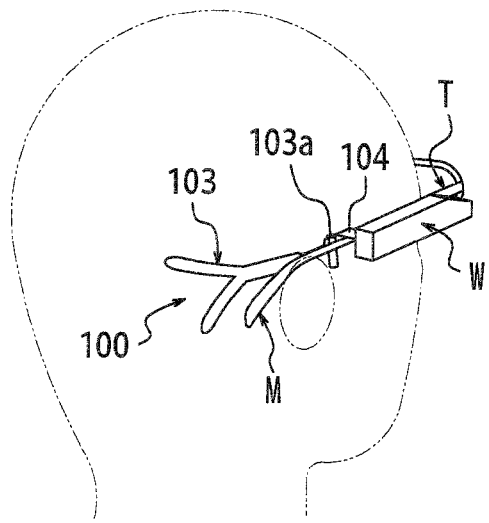
FIGS. 4A to 4D are views for illustrating further another head abutment portion and an action thereof, of the device-mounting support member according to the first embodiment of the present invention.

FIG. 4A illustrates a modified example of the head abutment portion 103 of the device-mounting support member 100 described above. In FIG. 4A, the head abutment portion 103 has a leading end portion curved in the direction along the head shape, that is, curved to the inside of the temple portion T of the eyeglass frame, and the leading end portion is further branched or bent in a plurality of directions along the head of the wearer. Specifically, FIG. 4A illustrates the head abutment portion 103 branched backward of the head as being extended in a Y-shaped fashion. FIG. 4D is a view for illustrating an action of the head abutment portion of FIG. 4A, and is a back view of the head abutment portion of FIG. 4A viewed from behind the head.

Figure 4B:
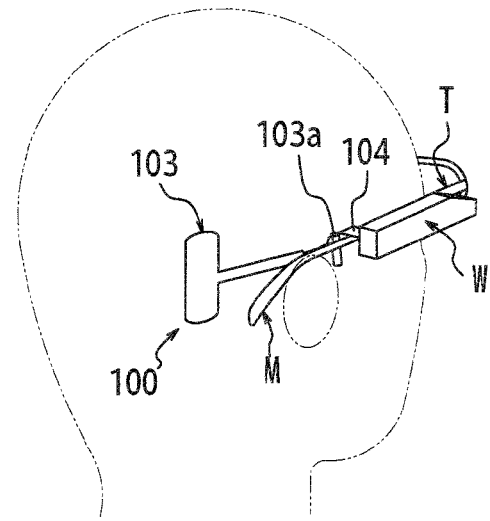
Figure 4C:
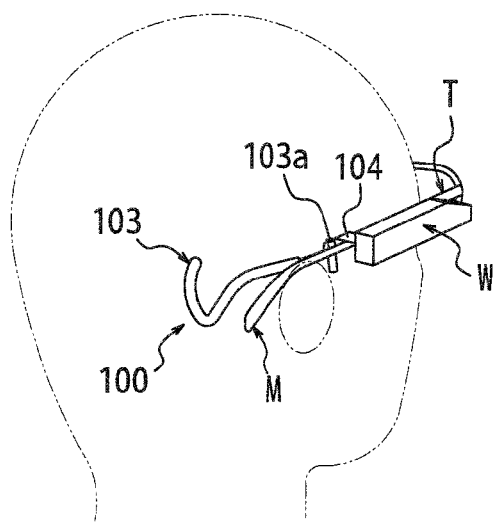
Figure 4D:
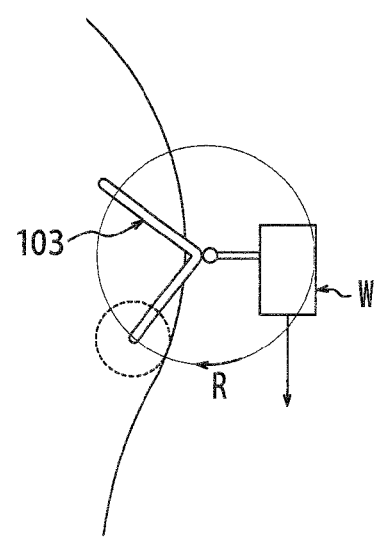

FIGS. 4B and 4C illustrate modified examples of the head abutment portion 103 of the device-mounting support member 100 described above. In FIG. 4B, the head abutment portion 103 is branched backward of the head as being extended in the upward and downward directions. In FIG. 4C, the head abutment portion 103 is bent upward and downward as extending backward of the head. With this configuration, the interference to be caused by the head can be increased, so as to more reliably prevent the device-mounting support member 100 from being rotated about an axis along the temple portion T of the eyeglass frame.

FIG. 4D is a view for illustrating an action of the head abutment portion of FIG. 4A, and is a back view of FIG. 4A viewed from behind the head. In the example illustrated in FIG. 4D, the head abutment portion 103 is not only curved backward but also branched upward and downward, along the head of the wearer, so that the wearable device W can be highly effectively prevented from being rotated in the direction indicated by the arrow R in the drawing and also prevented from being rotated in the inverse direction with respect to the arrow R.

Figure 5A:
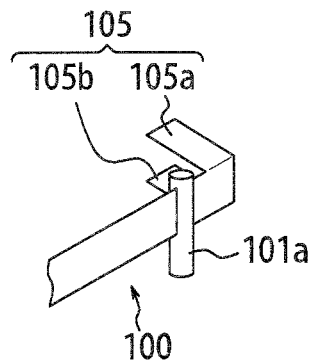
FIGS. 5A to 5C are views illustrating modified examples of a structure around an eyeglass attachment portion of the device-mounting support member according to the first embodiment of the present invention.
Figure 5B:
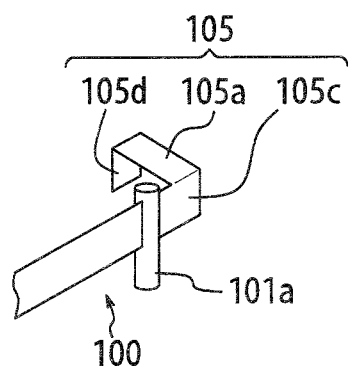
Figure 5C:
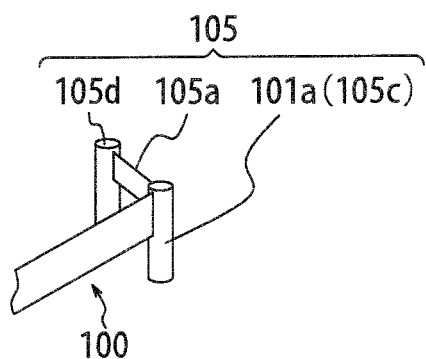

FIGS. 5A to 5C are views illustrating modified examples of a structure around the eyeglass attachment portion of the device-mounting support member 100 described above. In FIGS. 5A to 5C, the device-mounting support member 100 has a movement prevention portion 105 at the end of a support frame. The movement prevention portion 105 prevents the device-mounting support member 100 from moving in the vertical direction or in the lateral direction when the device-mounting support member 100 is attached to the eyeglass frame.

The movement prevention portion 105 illustrated in FIG. 5A has a first portion 105a to be engaged with the upper side of the temple portion T of the eyeglass frame and a second portion 105b to be engaged with the lower side of the temple portion T of the eyeglass frame. The first portion 105a effectively prevents the device-mounting support member 100 from moving downward by gravity, while the second portion 105b effectively prevents the device-mounting support member 100 from moving upward.

The movement prevention portion 105 illustrated in FIG. 5B has the first portion 105a to be arranged on the upper side of the temple portion T of the eyeglass frame, a third portion 105c to be arranged on the outside of the temple portion T of the eyeglass frame, and a fourth portion 105d to be arranged on the inside of the temple portion T of the eyeglass frame. The first portion 105a effectively prevents the device-mounting support member 100 from moving downward by gravity, and the third portion 105c and the fourth portion 105d effectively prevent the device-mounting support member 100 from moving from side to side. In particular, the movement prevention portion 105 of FIG. 5B has a gate-like structure, which makes the device-mounting support member 100 less prone to slip off from the eyeglass frame when attaching the device-mounting support member 100 on the eyeglass frame, to thereby make the attachment operation easier.

The movement prevention portion 105 of FIG. 5C is similar in configuration to the movement prevention portion 105 of FIG. 5B, but different in that the first pressing portion 101a and the above-mentioned third portion 105c are integrally formed.

Second Embodiment

Figure 6A:
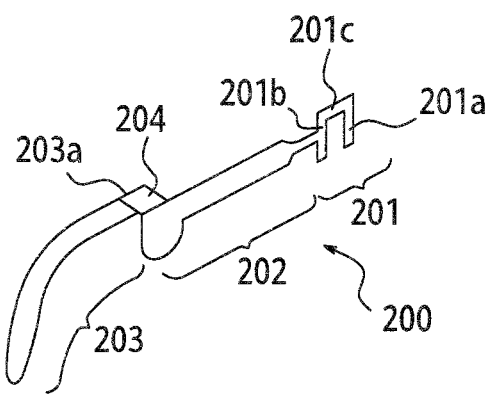
FIGS. 6A and 6B are views schematically illustrating a device-mounting support member according to a second embodiment of the present invention.
Figure 6B:
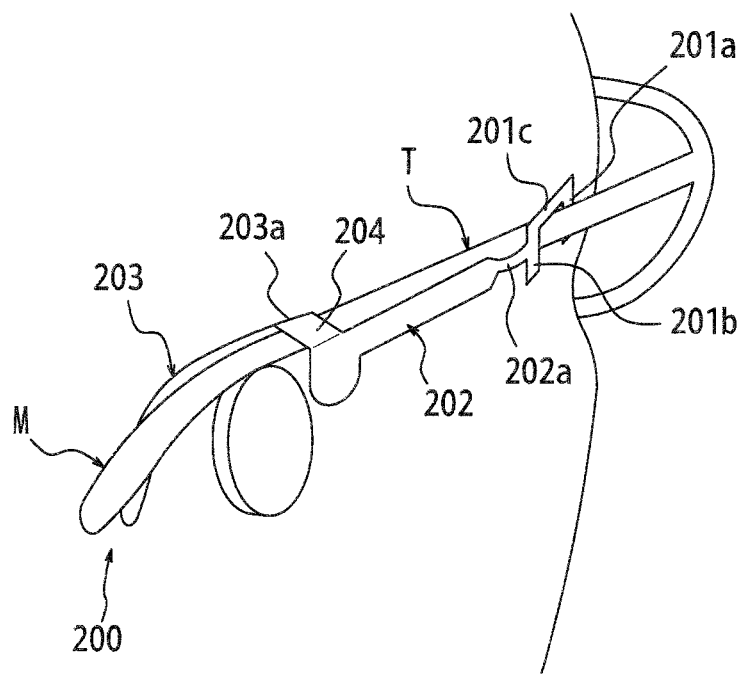

FIG. 6A is a perspective view schematically illustrating a device-mounting support member 200 according to a second embodiment, and FIG. 6B is a schematic view illustrating the device-mounting support member 200 of FIG. 6A, which is attached to an eyeglass frame and worn by a wearer.

In FIGS. 6A and 6B, the device-mounting support member 200 includes: an eyeglass attachment portion 201 having a first pressing portion 201a to be pressed against the temple portion T of an eyeglass frame; a support frame portion 202 to be attached with the wearable device W, the support frame portion 202 extending substantially parallel to the temple portion T of the eyeglass frame from the eyeglass attachment portion 201; and a head abutment portion 203 coupled to the support frame portion 202 so as to be abutted to the head of the wearer. With the aid of the eyeglass attachment portion 201 and the head abutment portion 203, the device-mounting support member 200 can be attached with ease. At the same time, the device-mounting support member 200 is fixed at two points, namely, at the eyeglasses and at the wearer, so as to be stably fixed. In particular, the eyeglass attachment portion 201 defines the attachment position with respect to the wearer, while the head abutment portion 203 prevents the device from falling off and rotating with respect to the temple of the eyeglasses.

As illustrated in FIG. 6B, the support frame portion 202 is arranged on the outside of the temple portion T of the eyeglass frame, while the head abutment portion 203 is arranged on the inside of the temple portion T of the eyeglass frame and curved in the direction along the head shape, that is, curved to the inside of the temple portion T of the eyeglass frame. The support frame portion 202 and the head abutment portion 203 are coupled to each other via a support bridge portion 204 that straddles above the temple portion T of the eyeglass frame. The support frame portion 202 is arranged on the outside of the eyeglass frame, which allows the wearable device to be attached with ease.

In FIGS. 6A and 6B, the first pressing portion 201a of the eyeglass attachment portion 201 is arranged on the inside of the temple portion T of the eyeglass frame, and the head abutment portion 203 has a second pressing portion 203a to be pressed against the inside of the temple portion T of the eyeglass frame.

In FIGS. 6A and 6B, the eyeglass attachment portion 201 further includes: an outside attachment portion 201b which is coupled to the support frame portion 202 and arranged on the outside of the temple portion T of the eyeglass frame; and an attachment bridge portion 201c directly coupling the first pressing portion 201a and the outside attachment portion 201b to each other across the upper side of the temple portion T of the eyeglass frame. The eyeglass attachment portion 201 is configured to be pressed and clamped from the inside and the outside of the eyeglass frame, so as to be stably fixed.

With this configuration, the outside attachment portion 201b serves as a pivot point with respect to the temple portion T when the support member 200 is attached to the eyeglass frame, and the support frame portion 202 exerts an elastic force to cause the first pressing portion 201a to be pressed against the temple portion from the inside to the outside of the temple portion T of the eyeglass frame and the second pressing portion 203a to be pressed against the temple portion from the inside to the outside of the temple portion T of the eyeglass frame. As a result, the device can be attached with ease while the device is stably fixed when worn.

At this time, the support frame portion 202 coupling to the outside attachment portion 201b of the eyeglass attachment portion 201 may have a part 202a that is smaller in spring constant as compared to the rest of the support frame portion 202, so as to be easily adapted to both of a wide temple and a narrow temple due to the difference in amount of deflection of the spring.

A modified example of the head abutment portion, a modified example of a structure surrounding the eyeglass attachment portion, and coupling means to be attached with a wearable device in the second embodiment are similar to those of the first embodiment described above as illustrated in FIGS. 3 and 4.

Figure 7A:
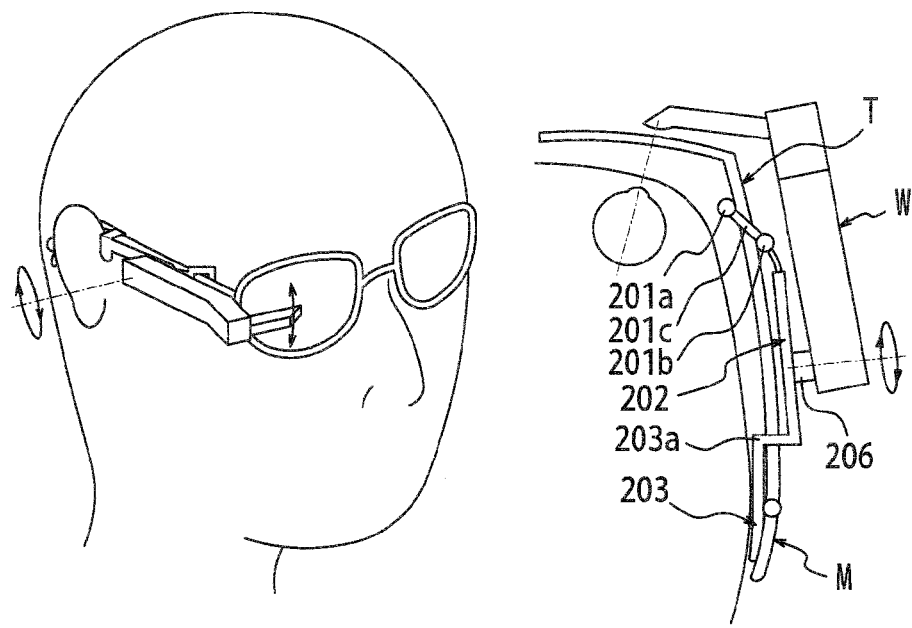
FIGS. 7A and 7B are views for illustrating coupling means and the action thereof, of the device-mounting support member according to the second embodiment of the present invention.
Figure 7B:
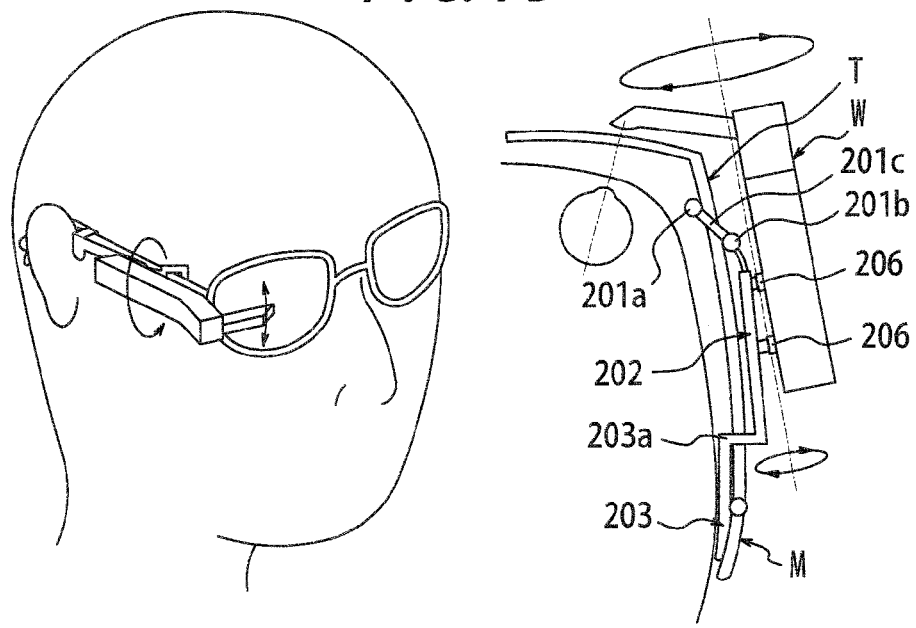

FIGS. 7A and 7B each are an external perspective view and a partial plan view, respectively, illustrating the support member 200 attached with the wearable device W, which is attached to an eyeglass frame and mounted on the head of the wearer. In FIGS. 7A and 7B, the support frame portion 202 has coupling means 206 for attaching the wearable device W so as to be adjustable in attachment posture. For example, when mounting, as the wearable device, a head-mounted image display device that requires adjustment with respect to an eyeball of the wearer, the coupling means 206 thus employed allows the exit pupil of the head-mounted image display device to be adjusted to the visual axis of the wearer, in accordance with eyeglass frames in various shapes.

Further, as illustrated respectively in FIGS. 7A and 7B, the coupling means 206 described above has a mechanism capable of rotating the wearable device W in at least one of a pitch direction (FIG. 7A) and a roll direction (FIG. 7B) with respect to the extending direction of the temple portion T of the eyeglass frame. The dimensional variations among eyeglass frames in different shapes result in a misalignment between the exit pupil of the head-mounted image display device and the visual axis of an eyeball, and the misalignment significantly varies particularly in the vertical direction. Such a misalignment in the vertical direction can be adjusted by the rotating mechanism, which is easier to be downsized as compared to a slide mechanism.

Although FIGS. 7A and 7B illustrates the device-mounting support member 200 of the second embodiment, the same applies to the device-mounting support member 100 of the first embodiment.

FIGS. 8A to 8C are views illustrating an example of a method of attaching, to an eyeglass frame, the device-mounting support member 200 according to the second embodiment of the present invention. In FIGS. 8A to 8C, first, the head abutment portion 203 is hung on the end cover portion M of the eyeglass frame (FIG. 8A), and then the eyeglass attachment portion 201 is hung on the temple portion T of the eyeglass frame (FIG. 8B). Lastly, the wearable device W is attached thereto (FIG. 8C). Alternatively, the device-mounting support member 200 may be attached with the wearable device W in advance, and then fixed to the eyeglass frame.

Figure 9A:
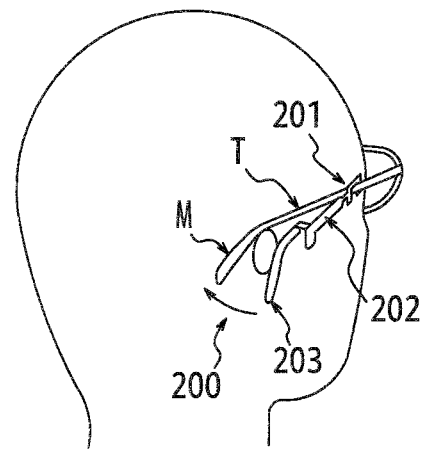
FIGS. 9A to 9D are views illustrating an example of another method of attaching, to an eyeglass frame, the device-mounting support member according to the second embodiment of the present invention.
Figure 9B:
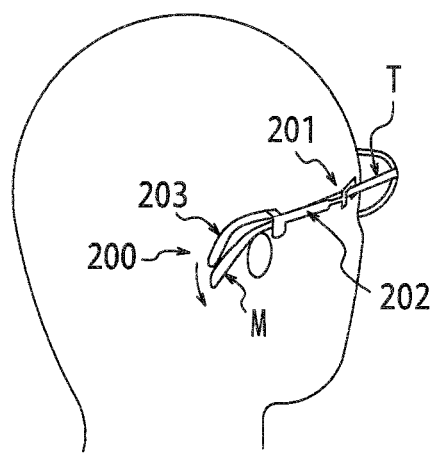
Figure 9C:
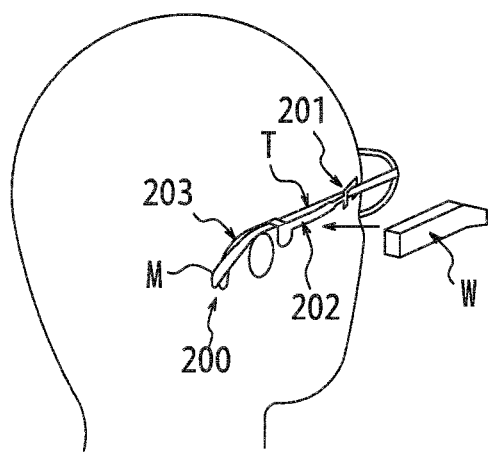
Figure 9D:
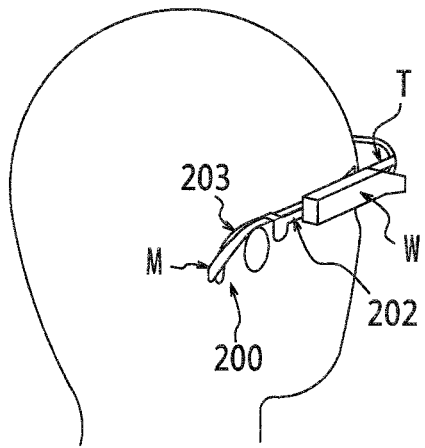

FIGS. 9A to 9D are views illustrating an example of another method of attaching, to an eyeglass frame, the device-mounting support member 200 according to the second embodiment of the present invention described above. In FIGS. 9A to 9D, first, the eyeglass attachment portion 201 is hung on the temple portion T of the eyeglass frame (FIG. 9A), and then the head abutment portion 203 is hung on the end cover portion M of the eyeglass frame (FIG. 9B). Lastly, the wearable device W is attached thereto (FIGS. 9C and 9D). Alternatively, the device-mounting support member 200 may be attached with the wearable device W in advance, and then fixed to the eyeglass frame.

Figure 10A:
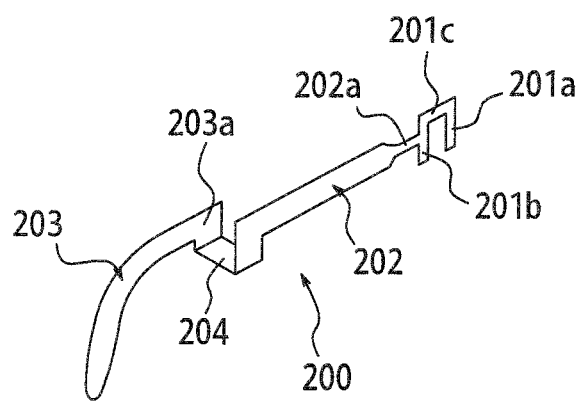
FIGS. 10A to 10C are views illustrating a modified example of a support bridge portion of the device-mounting support member according to the second embodiment of the present invention and an attachment method thereof.
Figure 10B:
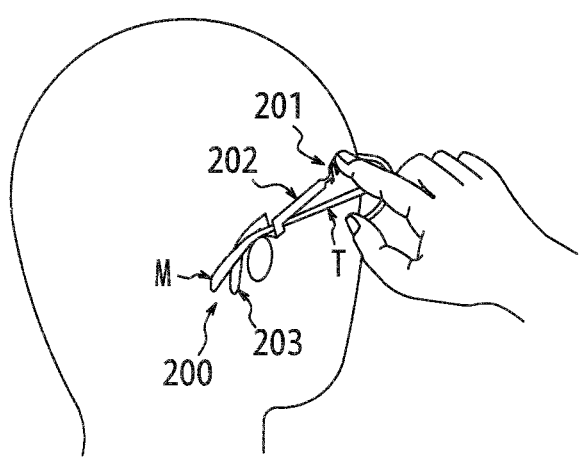
Figure 10C:
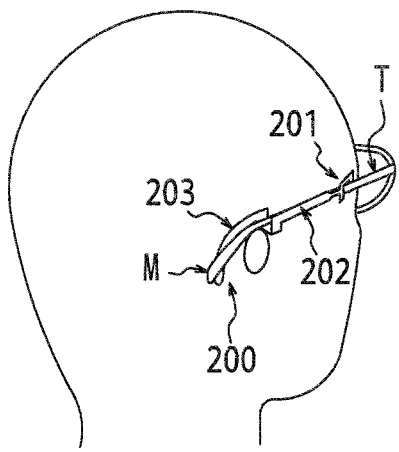

FIGS. 10A to 10C are views illustrating a modified example of the support bridge portion 204 of the device-mounting support member 200 according to the second embodiment of the present invention described above and an attachment method thereof. The device-mounting support member 200 of FIG. 10A has the support bridge portion 204 that straddles below the temple portion T of the eyeglass frame. In this case, first, the head abutment portion 203 is hung on the ear of the wearer (FIG. 10B), and then the eyeglass attachment portion 201 is hung on the temple portion T of the eyeglass frame (FIG. 10C). Lastly, the wearable device W is attached thereto. Alternatively, the device-mounting support member 200 may be attached with the wearable device W in advance, and then fixed to the eyeglass frame.

Third Embodiment

Figure 11A:
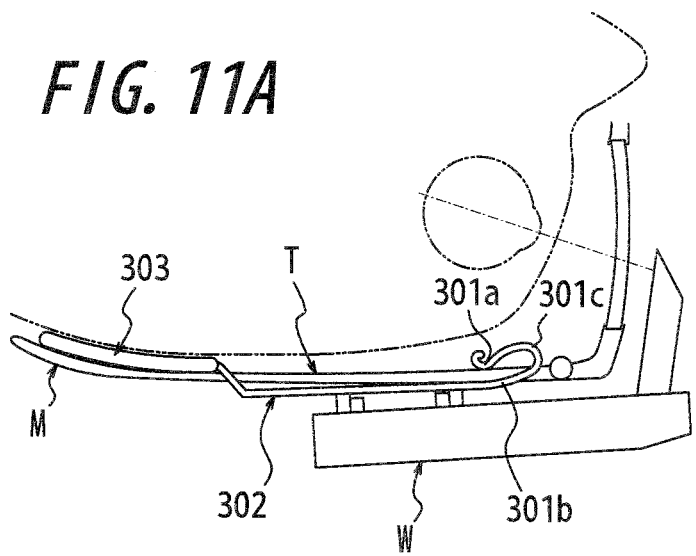
FIGS. 11A to 11C are views illustrating an eyeglass attachment portion of a device-mounting support member according to a third embodiment of the present invention.
Figure 11B:
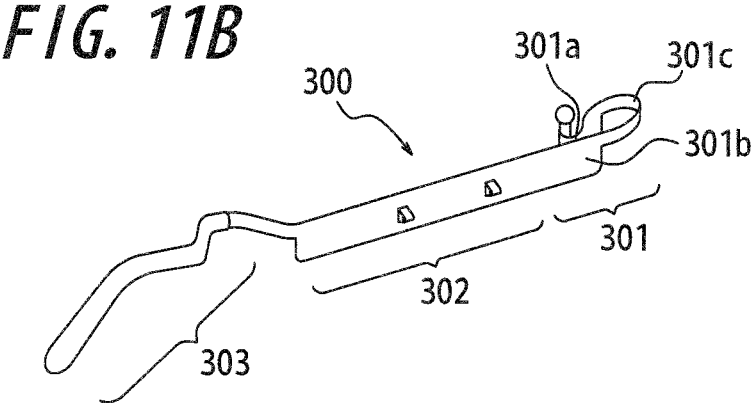
Figure 11C:
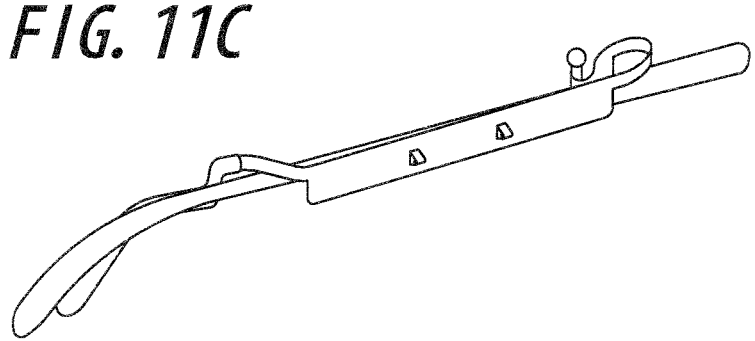

FIGS. 11A to 11D are views illustrating a device-mounting support member 300 according to a third embodiment of the present invention, in which: FIG. 11A is a plan view illustrating the device-mounting support member 300 attached with the wearable device W, which is attached to an eyeglass frame and worn by a wearer; FIG. 11B is a perspective view illustrating the device-mounting support member 300; and FIG. 11C is a perspective view illustrating the device-mounting support member 300 of FIG. 11B attached to an eyeglass frame.

As illustrated in FIGS. 11A to 11C, an eyeglass attachment portion 301 has an outside attachment portion 301b which is coupled to a support frame portion 302 and arranged on the outside of the frame portion T of the eyeglass frame, and an attachment bridge portion 301c directly coupling a first pressing portion 301a and the outside attachment portion 301b to each other across the upper side of the temple portion T of the eyeglass frame. The attachment bridge portion 301c exerts an elastic force to cause the first pressing portion 301a to be pressed against the temple portion T from the inside to the outside of the temple portion T of the eyeglass frame. The head abutment portion 303 prevents the device from falling off and rotating with respect to the temple of the eyeglasses.

Figure 12A:
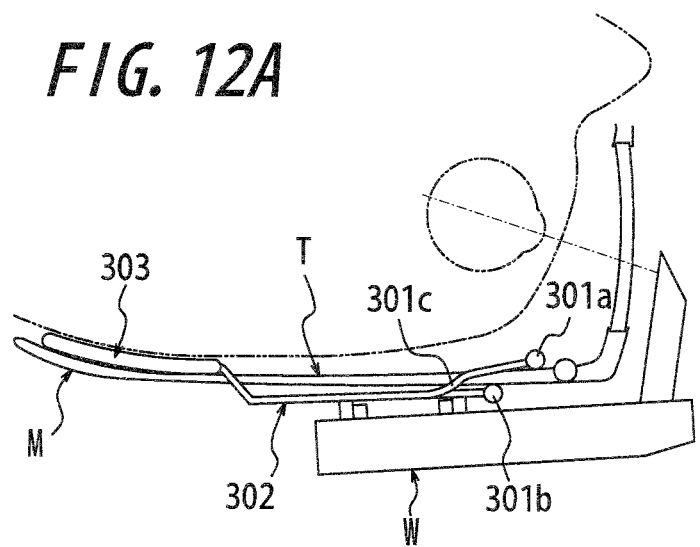
FIGS. 12A to 12C are views illustrating modified examples of the eyeglass attachment portion of the device-mounting support member according to the third embodiment of the present invention.
Figure 12B:
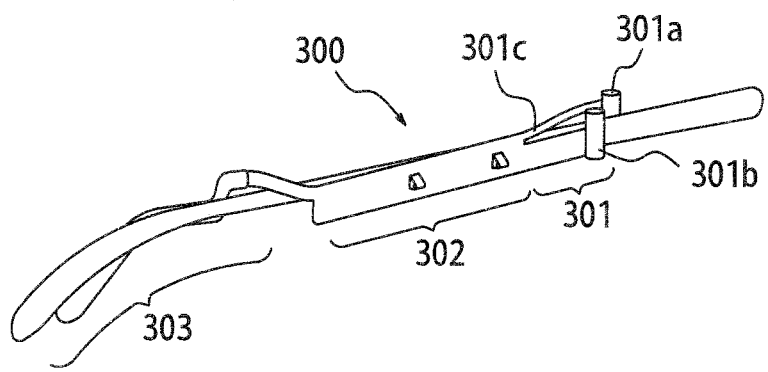
Figure 12C:
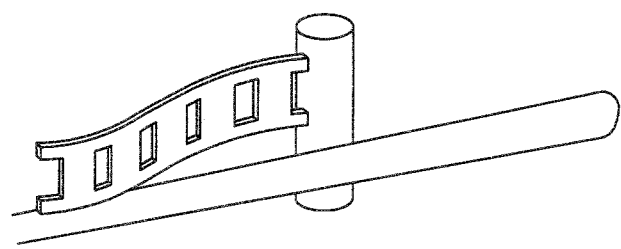

Further, FIGS. 12A to 12C are views illustrating modified examples of the eyeglass attachment portion 301 of the device-mounting support member 300 according to the third embodiment of the present invention, in which: FIG. 12A is a plan view illustrating the device-mounting support member 300 attached with the wearable device W, which is attached to an eyeglass frame and worn by a wearer; and FIG. 12B is a perspective view illustrating the device-mounting support member 300 attached to an eyeglass frame.

The eyeglass attachment portion 301 in FIGS. 12A to 12C is different from the one illustrated FIGS. 11A to 11C in that the attachment bridge portion 301c couples the first pressing portion 301a and the support frame portion 302. In other words, the attachment bridge portion 301c extends, as diverging from the support frame portion 302. The outside attachment portion 301b is coupled to the support frame portion 302, and hence the first pressing portion 301a is pressed against the temple portion from the inside to the outside of the temple portion T of the eyeglass frame due to an elastic force exerted by the attachment bridge portion 301c. Further, as illustrated in FIG. 12C, the attachment bridge portion 301c may be formed of a wide spring with openings, which produces effects of preventing a twist thereof and also allowing adjustment of the spring constant.

Fourth Embodiment

Figure 13A:
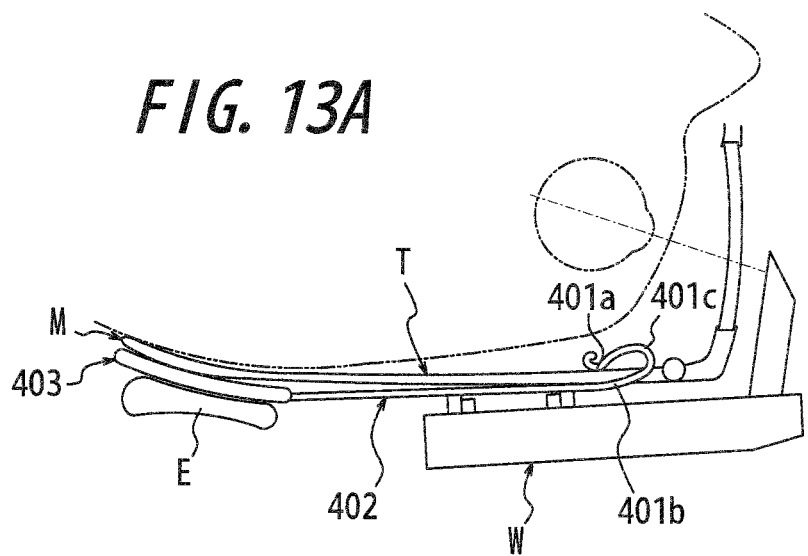
FIGS. 13A to 13C are views illustrating an eyeglass attachment portion of a device-mounting support member according to a fourth embodiment of the present invention.
Figure 13B:
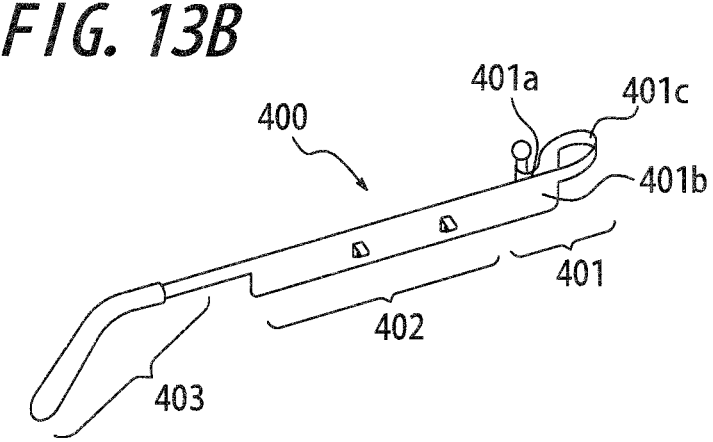
Figure 13C:
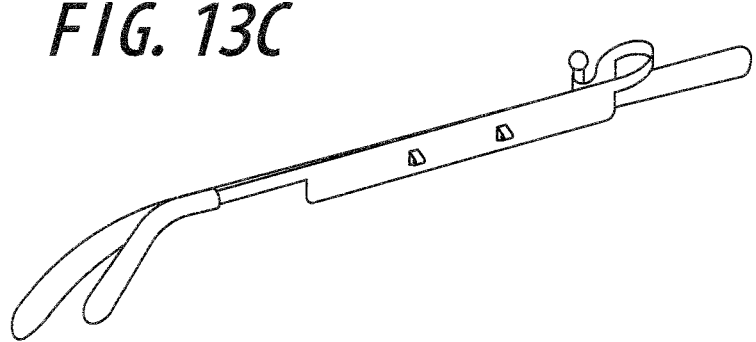

FIGS. 13A to 13C are views illustrating a device-mounting support member 400 according to a fourth embodiment of the present invention, in which: FIG. 13A is a plan view illustrating the device-mounting support member 400 attached with the wearable device W, which is attached to an eyeglass frame and worn by a wearer; FIG. 13B is a perspective view illustrating the device-mounting support member 400; and FIG. 13C is a perspective view illustrating the device-mounting support member 400 of FIG. 13B attached to an eyeglass frame.

As illustrated in FIGS. 13A to 13C, an eyeglass attachment portion 401 has a pressing portion 401a, an outside attachment portion 401b which is coupled to a support frame portion 402 and arranged on the outside of the frame portion T of the eyeglass frame, and an attachment bridge portion 401c for coupling a first pressing portion 401a and the outside attachment portion 401b to each other across the upper side of the temple portion T of the eyeglass frame. Further, the support frame portion 402 and an ear hook portion 403 are arranged on the outside of the temple portion T of the eyeglass frame. Then, the pressing portion 401a is pressed against the frame portion from the inside to the outside of the eyeglass frame due to an elastic force exerted by the attachment bridge portion 401c.

Fifth Embodiment

FIGS. 14A and 14B are schematic diagrams for illustrating a structure of a device-mounting support member according to a fifth embodiment of the present invention, in which: FIG. 14A is a top view illustrating the device-mounting support member unattached to eyeglasses, and FIG. 14B is a top view illustrating the device-mounting support member attached to an eyeglass temple.

As illustrated in FIG. 14A, the device-mounting support member 501 includes: a first contact portion 511; a second contact portion 512; a third contact portion 513; a coupling portion 516; and a device attachment portion 518.

The first contact portion 511, the second contact portion 512, and the third contact portion 513 are columnar members of 5 mm to 20 mm in height, with a central axis extending in the vertical direction when attached to eyeglasses. The contact portions 511 to 513 each have a portion to abut to an eyeglass temple (hereinafter, simply referred to as "temple") 520 when attached to eyeglass 521, the portion being covered with an elastic member such as rubber so as not to be slippery with respect to the temple 520 while preventing damage to the temple 520. Further, the first contact portion 511, the third contact portion 513, and the second contact portion 512 are linearly arranged in this order from the front.

The coupling portion 516 is configured by including: a rigid portion 516c fixed to the third contact portion 513; a first arm portion 516a coupling the rigid portion 516c and the first contact portion 511 to each other; a second arm portion 516b coupling the rigid portion 516c and the second contact portion 512 to each other. The first arm portion 516a and the second arm portion 516b are each formed of a member having a spring property, such as a leaf spring. It should be noted that the term "rigid" refers to a property of having a strength sufficient enough to prevent a significant deformation from being caused when worn, and the term "spring property" refers to a property of being deformed under the application of an external force when worn and getting back to its original shape once the external force is removed.

Here, the first arm portion 516a and the second arm portion 516b are smaller in width of height (width in a direction perpendicular to the paper plane of FIG. 14) than the first contact portion 511, the second contact portion 512, and the third contact portion 513, and the coupling portion 516 couples the upper portions of the first contact portion 511, the second contact portion 512, and the third contact portion 513 to one another. In other words, the first contact portion 511, the second contact portion 512, and the third contact portion 513 protrude below the first arm portion 516a and the second arm portion 516b.

The device attachment portion 518 is a member that has an attachment for attaching a device such as an HMD or a camera thereto. The attachment may be in various configurations including, for example, a groove to be fit with the device side, a screw hole for screwing, and a clamp. The device attachment portion 518 is fixed to the rigid portion 516c of the coupling portion 516. The device attachment portion 518 may also be attached, rather than to the coupling portion 516, but to any of the contact portions 511, 512, 513, or may be attached so as to straddle both of the coupling portion 516 and the contact portions 511, 512, 513.

As illustrated in FIG. 14B, the device-mounting support member 501 is attached to the temple 520 of eyeglasses. The temple 520 is a temple on the right side of eyeglasses, and the upper direction of FIG. 14B corresponds to the front direction of the eyeglasses.

When attached to the eyeglasses, the first contact portion 511 and the second contact portion 512 lie on the inside of the temple 520, that is, on the head side of the wearer, while the third contact portion 513 lies on the outside of the temple 520 and abuts to the temple 520 in such a manner as to clamp the temple 520 at a portion lower than the first arm portion 516a and the second arm portion 516b. At this time, due to a reaction force (returning force of the spring) against a bending stress applied to the first arm portion 516a and the second arm portion 516b having a spring property, the first contact portion 511 and the second contact portion 512 exert forces $F_1$ and $F_2$ to the outside, respectively, on a side surface on the inside of the temple 520 while the third contact portion 513 exerts a force $F_3$ to the inside on a side surface on the outside of the temple 520 opposite to the inside of the temple 520, in a direction opposite to the forces $F_1$ and $F_2$. The device-mounting support member 501 is fixed to the temple 520 between the first contact portion 511 and the third contact portion 513, and between the second contact portion 512 and the third contact portion 513, by the forces $F_1$, $F_2$, $F_3$ for clamping the temple 520 and frictional forces generated therefrom.

Figure 15A:
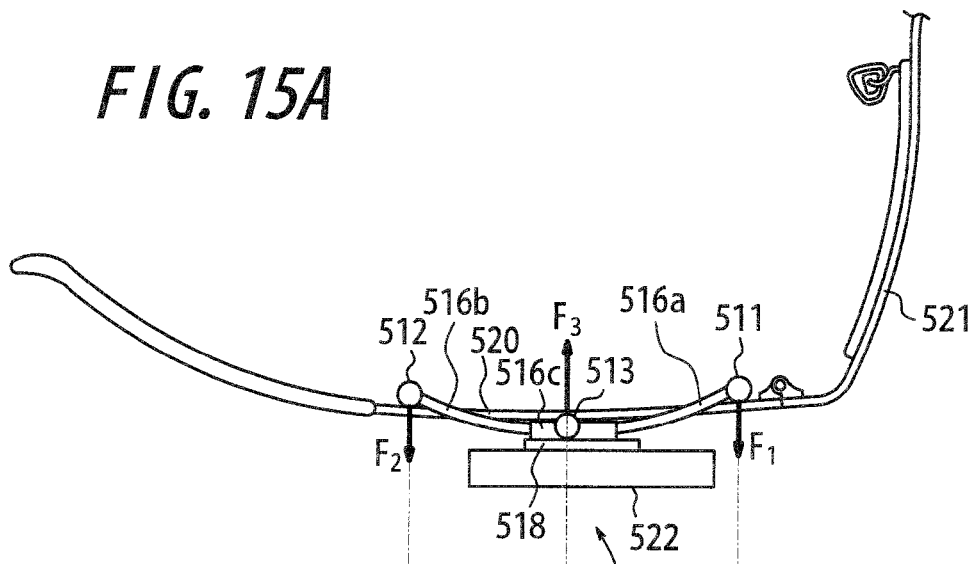
FIGS. 15A and 15B are views illustrating the device-mounting support member of FIG. 14 attached to eyeglasses.
Figure 15B:
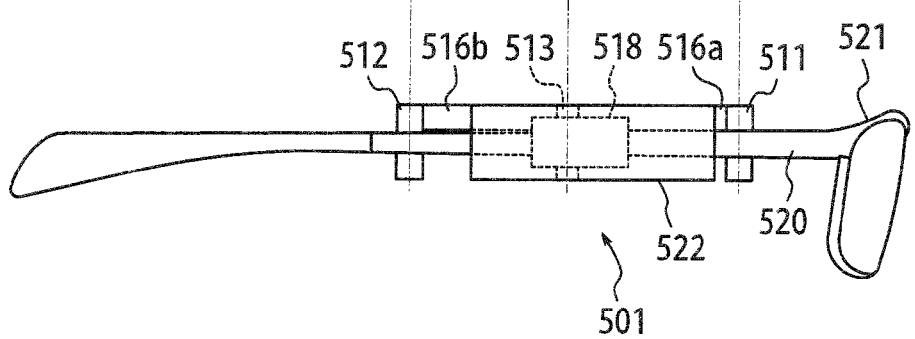

FIGS. 15A and 15B are views illustrating the device-mounting support member of FIG. 14 attached to eyeglasses, in which FIG. 15A is a top view and FIG. 15B is a side view of a portion on the right side of the eyeglasses. In the drawings, a device 522 such as an HMD or a camera is attached to the device attachment portion 518. These devices are compact and light-weight mobile devices that are supportable by the temple.

As illustrated in FIGS. 15A and 15B, the device-mounting support member 501 is attached along a longitudinal direction of the temple 520 on the right side of the eyeglasses 521. As illustrated in FIG. 15B, the device-mounting support member 501 is attached in such a manner that the first arm portion 516a and the second arm portion 516b extend along the upper side of the temple 520, while the first contact portion 511, the second contact portion 512, and the third contact portion 513 protrude below the coupling portions 516a, 516b so as to elastically abut to the temple 520 at the portion thus protruded.

With the above-mentioned configuration, when attaching the device-mounting support member 501 to the eyeglasses 521, the third contact portion 513 is pulled outward with respect to the first contact portion 511 and the second contact portion 512 so that the first arm portion 516a and the second arm portion 516b, which have a spring property and form the coupling portion 516, are inflected, so as to clamp the temple 520 from above the temple 520 between the first contact portion 511 and the third contact portion 513 and between the second contact portion 512 and the third contact portion 513. In this manner, the device-mounting support member 501 is supported on the temple 520 as illustrated in FIGS. 15A and 15B.

Further, the device 522 can be attached to the device attachment portion 518 without detaching the device-mounting support member 501 from the temple 520. The device 522 may be attached in advance to the device attachment portion 518 of the device-mounting support member 501, and then the device-mounting support member 501 may be attached to the temple 520.

As described above, according to this embodiment, when attached to the temple 520, the third contact portion 513 is arranged, in a direction along the temple 520, between the first contact portion 511 and the second contact portion 512, and the coupling portion 516 includes the first arm portion 516a and the second arm portion 516b each having a spring property, so that the spring property of the first arm portion 516a and the second arm portion 516b causes the first contact portion 511 and the second contact portion 512, and the third contact portion 513 to elastically abut to the side surfaces of the temple, the first contact portion 511 and the second contact portion 512 being arranged on an opposite side to the third contact portion 513 across the temple. As a result, the device-mounting support member 501 can be attached with ease without getting in the way when the eyeglasses are worn and can be fixed to the temple 520 excellently without impairing the appearance.

Further, the coupling portion 516 extends along the temple 520 as being attached to the temple 520, and hence the attachment members do not stick out from the eyeglasses, which makes the device further less noticeable. Further, the coupling portion 516 can be formed of a plate-like member, so that the entire device can be made thin (without extending laterally) and lightweight.

Further, the first to third contact portions 511, 512, 513 are formed of elastic members, which prevents damage from being caused to the temple 520, which is often plated and susceptible to scratch, when mounting the support member on the temple 520. Further, the friction between the first to third contact portions 511, 512, 513 and the temple 520 can be increased, to thereby prevent the support member from falling off from the eyeglasses 521.

Further, the first to third contact portions 511, 512, 513 are 5 mm to 20 mm in height, which is higher than a general height of a temple, and hence the mounting height to the temple 520 can be changed within the range and the orientation of the device can be adjusted with respect to the temple 520.

It should be noted that the first to third contact portions 511, 512, 513 are each configured to be in a columnar shape, but the shape thereof is not limited to the columnar shape, and may be formed in a different shape so as to prevent the device-mounting support member 501 from falling off from the temple 520. Alternatively, the contact portion may be formed of a strip-shaped rubber sheet adhered to a plate-like coupling portion.

Figure 16A:
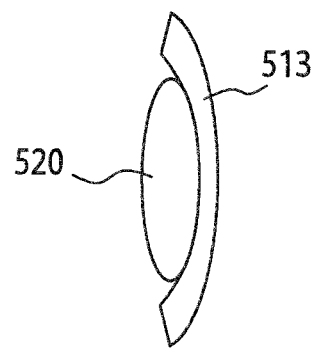
FIGS. 16A and 16B are views for illustrating a structure for preventing a falling-off from a temple, in the device-mounting support member of FIG. 14.
Figure 16B:
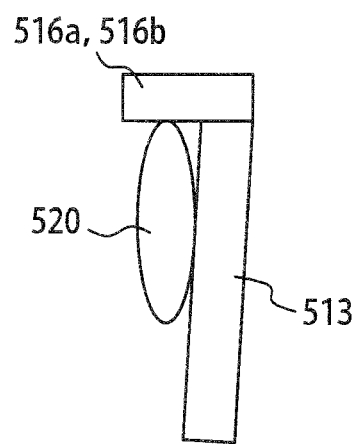

FIGS. 16A and 16B are views for illustrating a structure for preventing a falling-off from the temple 520, in the device-mounting support member 501 of FIG. 14, in which: FIG. 16A is a sectional view illustrating the third contact portion 513 formed in a curved shape; and FIG. 16B is a view illustrating the third contact portion 513, the first arm portion 516a, the second arm portion 516b, and the temple 520 viewed in a direction along the temple, in which the third contact portion 513 is tilted to form an acute angle with the coupling portion 516. FIGS. 16A and 16B both illustrate cross sections of the third contact portion 513 viewed forward from behind. Further, the first contact portion 511 and the second contact portion 512 may also be configured similarly to the third contact portion 513, symmetrically on the left.

As illustrated in FIG. 16A, the third contact portion 513 may be configured to be curved so that a surface on the temple 520 side follows the shape of the temple 520, so that the temple 520 can be prevented from being displaced from the third contact portion 513, to thereby prevent the temple 520 from falling off from the device-mounting support member 1.

Further, in FIG. 16B, the third contact portion 513 is tilted with respect to the first arm portion 516a and the second arm portion 516b so as to form an acute angle therewith in the cross section of FIG. 16B. With this configuration, the temple 520 can be prevented from being displaced below the third contact portion 513 to fall off.

Further, the first contact portion 511, the third contact portion 513, and the second contact portion 512, which are linearly arranged in this order from the front, may also be arranged, on the contrary, from the back in this order. Further, the device-mounting support member 501 may not necessarily be formed in a linear shape as illustrated in FIG. 14A when unattached to the temple 520, and may be in another shape, for example, warped in a direction opposite to the shape of the support member attached to the temple.

Further, the distance between the third contact portion 513 and the first contact portion 511, and the distance between the third contact portion 513 and the second contact portion 512 each are preferably two times or more larger than the maximum value of a temple width of eyeglasses to be worn. This configuration can suppress changes in amount of bending to be applied to the first arm portion 516a and/or the second arm portion 516b each having a spring property, which is otherwise caused resulting from the difference in thickness of the temple, so that the device-mounting support member 501 can be attached and removed with substantially the same level of force even when the thickness of the temple varies.

Sixth Embodiment

Figure 17A:
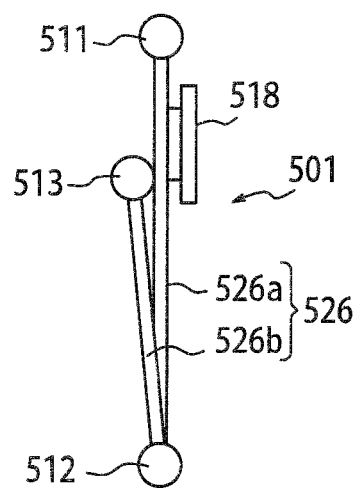
FIGS. 17A to 17C are schematic diagrams for illustrating a structure of a device-mounting support member according to a sixth embodiment of the present invention.
Figure 17B:
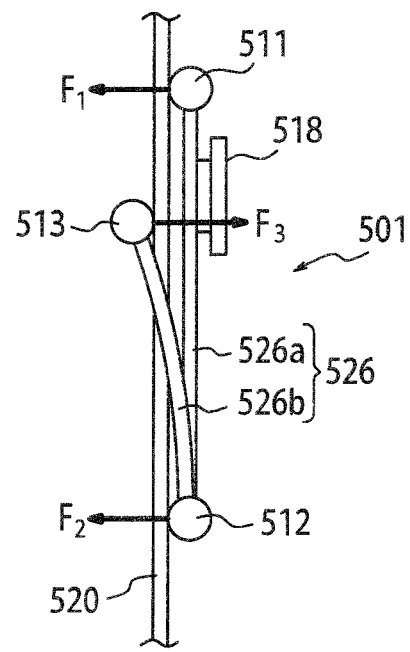
Figure 17C:
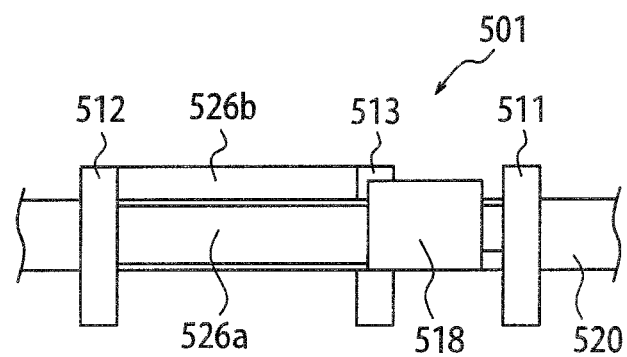

FIGS. 17A to 17C are schematic diagrams for illustrating a structure of a device-mounting support member according to a sixth embodiment of the present invention. FIG. 17A is a top view illustrating the device-mounting support member unattached to eyeglasses, FIG. 17B is a top view illustrating the device-mounting support member attached to a temple, and FIG. 17C is a side view illustrating the device-mounting support member attached to a temple.

In the device-mounting support member 501 according to the sixth embodiment, as compared to the fifth embodiment, the positional relation among the first contact portion 511, the second contact portion 512, and the third contact portion 513 is the same in the direction along an eyeglass frame, while being reversed in terms of the inside and the outside of the eyeglass frame 520. Further, the first contact portion 511 and the second contact portion 512 are coupled to each other, and the second contact portion 512 and the third contact portion 513 are coupled to each other. Meanwhile, the first contact portion 511 and the third contact portion 513 are not coupled to each other.

Further, a coupling portion 526 between the first contact portion 511 and the second contact portion 512 is configured as a rigid plate-like first arm portion 526a, and the device attachment portion 518 is fixed to the first arm portion 526a. The first arm portion 526a extends along the temple 520 in a position at substantially the same height as the temple 520, when attached to eyeglasses. Further, the coupling portion 526 between the second contact portion 512 and the third contact portion 513 is configured as a second arm portion 526b formed of a leaf spring having a spring property. The second arm portion 526b straddles above the temple 520 when attached to eyeglasses.

When attaching the device-mounting support member 501 to the temple 520, the third contact portion 513 is spaced apart from the first contact portion 511, the second contact portion 512, and the first arm portion 526a coupling the first contact portion 511 and the second contact portion 512 to each other, against the spring force exerted by the second arm portion 526b, so as to clamp the temple 520 from above the temple 520. In this manner, the device-mounting support member 501 is held in a state as illustrated in FIGS. 17B and 17C.

At this time, due to the reaction force against the bending stress applied to the second arm portion 526b having a spring property, the first contact portion 511 and the second contact portion 512 exert forces $F_1$ and $F_2$ to the inside, respectively, on a side surface on the outside of the temple 520, while the third contact portion 513 exerts a force $F_3$ on a side surface on the inside of the temple 520, to the outside direction, which is an opposite direction to the forces $F_1$ and $F_2$. The device-mounting support member 501 is fixed to and held by the temple 520 through the forces $F_1$, $F_2$, $F_3$ for clamping the temple 520 between the first contact portion 511 and the third contact portion 513 and between the second contact portion 512 and the third contact portion 513, and friction forces generated due to the forces $F_1$, $F_2$, $F_3$.

In the fifth embodiment, when viewed from above, the coupling portion 516 straddles the temple 520 at two points, namely, between the first contact portion 511 and the third contact portion 513 and between the second contact portion 512 and the third contact portion 513. However, in this embodiment, the coupling portion 526 straddles the temple at one point between the second contact portion 512 and the third contact portion 513. The rest of the configuration and effects thereof are similar to those of the fifth embodiment, and therefore the same constituent elements are denoted by the same reference symbols and the description thereof is omitted.

According to this embodiment, similarly to the fifth embodiment, the device-mounting support member 501 can be attached with ease without getting in the way when the eyeglasses are worn and can be fixed to the temple excellently without impairing the appearance. Further, the coupling portion 526 is configured to directly couple the first contact portion 511 and the second contact portion 512 to each other and also to directly couple the third contact portion 513 and the second contact portion 512 to each other, so that the coupling portion 526 straddles (intersects with, when viewed from above) the temple 520 at only one point. Accordingly, the intersecting point may be increased in length so as to be sufficiently longer than the thickness of a temple on which the support member is to be attached, to thereby reduce the variance in bending stress resulting from the variance in thickness of the temple. Further, the coupling portion 526 is configured to be folded back, at the second contact portion 512, from the first arm portion 526a to the second arm portion 526b, which reduces the total length of the device-mounting support member. Therefore, although the support member is compact in size, the support member can be attached by substantially the same level of force irrespective of the variance in thickness of the temple.

Further, the device-mounting support member 501 is attached in such a manner that the temple 520 extends in parallel with the rigid first arm portion 526a, and hence can be attached with ease by displacing the position of the third contact portion 513 so as to be spaced apart from the first arm portion 526a.

Seventh Embodiment

Figure 18A:
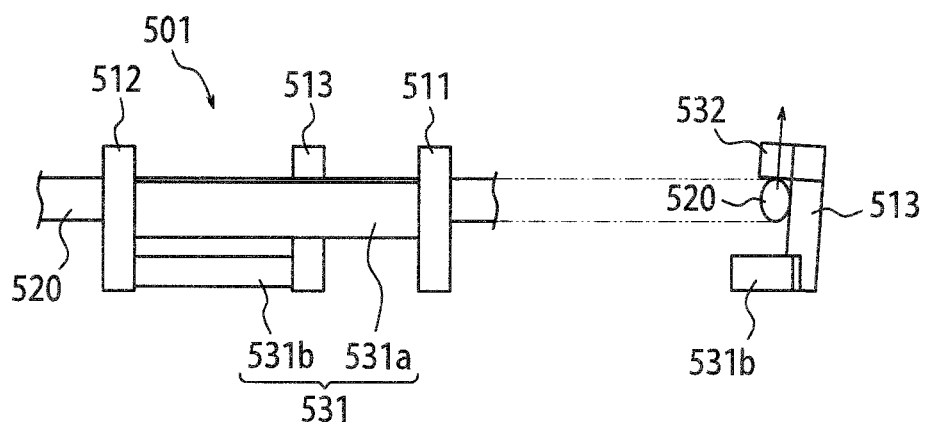
FIGS. 18A and 18B are schematic diagrams for illustrating a structure of a device-mounting support member according to a seventh embodiment of the present invention.
Figure 18B:
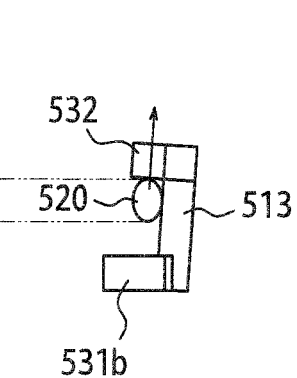

FIGS. 18A and 18B are schematic diagrams for illustrating a structure of a device-mounting support member according to a seventh embodiment of the present invention, in which: FIG. 18A is a side view thereof attached to eyeglasses; and FIG. 18B illustrates the third contact portion 513, the temple 520, and the second arm portion 531b, which are viewed from the front. The device-mounting support member 501 of this embodiment is different from the sixth embodiment in configuration of the coupling portion 531. The second arm portion 531b having a spring property between the second contact portion 512 and the third contact portion 513 is arranged on the lower side of the temple 520. On the other hand, the first arm portion 531a extends, similarly to the first arm portion 526a of the sixth embodiment, along the temple 520 in a position at substantially the same height as the temple 520.

Further, as illustrated in FIG. 18B, the third contact portion 513 has a canopy portion 532 formed at an upper end thereof, which is on the opposite side to the side where the second arm portion 531b is provided, so as to restrict the movement of the temple 520. In FIG. 18B, the third contact portion 513 is tilted because the lower portion of the third contact portion 513, to which the second arm portion 531b is coupled, is subjected to a force applied in the inside direction due to the spring property of the second arm portion 531b, when attached to the temple 520. Even if the third contact portion 513 is tilted, the temple 520 abuts to the third contact portion 513 and to the canopy portion 532, so that the device-mounting support member 501 is unlikely to fall off from the temple 520. The rest of the configuration and effects thereof are similar to those of the sixth embodiment, and therefore the same constituent elements are denoted by the same reference symbols and the description thereof is omitted. In FIG. 18, the device attachment portion 518 is omitted from the drawings.

According to this embodiment, similarly to the fifth embodiment, the device-mounting support member 501 can be attached with ease without getting in the way when the eyeglasses are worn and can be fixed to the temple excellently without impairing the appearance. Further, when the support member attached to the temple 520 is viewed laterally, the second arm portion 531b having a spring property extends in the extending direction of the temple 520 on the lower side of the temple 520, while the third contact portion 513 has the canopy portion 532 formed at an upper end thereof, which is on the opposite side in the vertical direction to the side having a spring property, with respect to the temple 520, so as to restrict the movement of the temple 520, so that the device-mounting support member 501 is less prone to fall off from the temple 520.

Eighth Embodiment

Figure 19A:
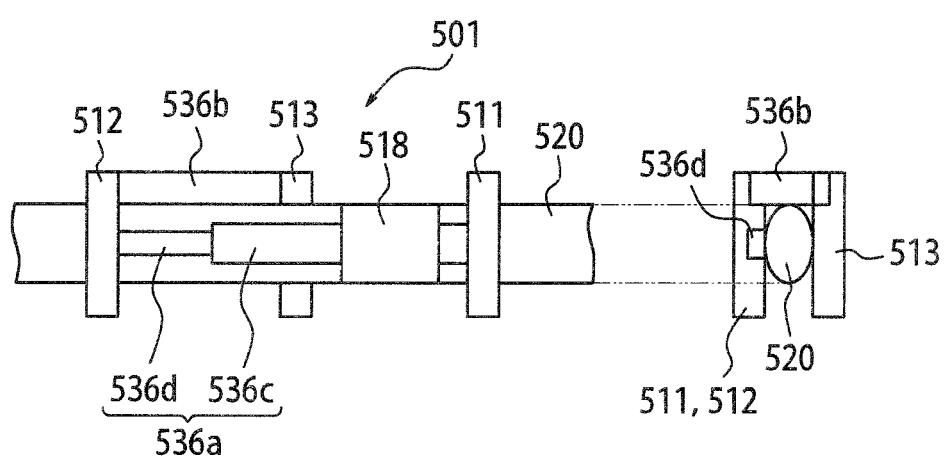
FIGS. 19A and 19B are schematic diagrams for illustrating a structure of a device-mounting support member according to an eighth embodiment of the present invention.
Figure 19B:
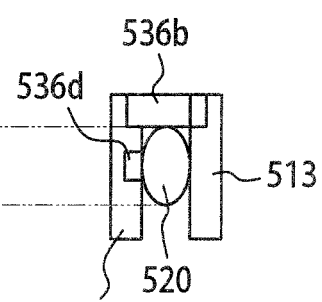

FIGS. 19A and 19B are schematic diagrams each for illustrating a structure of a device-mounting support member according to an eighth embodiment of the present invention, in which: FIG. 19A is a side view of the support member attached to eyeglasses; and FIG. 19B illustrates the support member viewed from the front in a direction along the temple 520. The device-mounting support member 501 according to the eighth embodiment is different from the device-mounting support member 501 of the sixth embodiment in that, in place of the coupling portion 526, a first arm portion 536a formed of a rigid portion 536c and a spring portion 536d is employed to couple the first contact portion 511 and the second contact portion 512 to each other, while a rigid second arm portion 536b is employed to couple the second contact portion 512 and the third contact portion 513 to each other. The device attachment portion 518 is fixed to the rigid portion 536c of the first arm portion 536a. The rest of the configuration and the effects thereof are similar to those of the sixth embodiment, and therefore the same constituent elements are denoted by the same reference symbols and the description thereof is omitted.

According to this embodiment, similarly to the fifth embodiment, the device-mounting support member 501 can be attached with ease without getting in the way when the eyeglasses are worn and can be fixed to the temple excellently without impairing the appearance. Further, when the support member attached to the temple 520 is viewed laterally, the spring portion 536d of the coupling portion 536 extends in the extending direction of the temple 520 in a position at substantially the same height as the temple 520. Accordingly, the spring portion 536d does not straddle the temple 520 above or below the temple 520, so as to prevent a moment (rotating force) from being exerted to the first to third contact portions 511, 512, 513 due to force to clamp the temple. As a result, the first contact portion 511, the second contact portion 512, and the third contact portion 513 are prevented from being tilted and from becoming susceptible to falling off from the temple 520.

Ninth Embodiment

Figure 20:
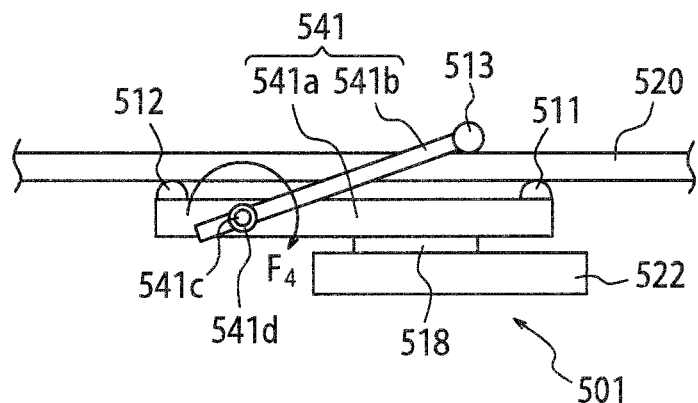
FIG. 20 is a schematic diagram for illustrating a structure of a device-mounting support member according to a ninth embodiment of the present invention.

FIG. 20 is a schematic diagram for illustrating a structure of a device-mounting support member according to a ninth embodiment of the present invention, illustrating the device-mounting support member attached to a temple.

This embodiment is different from the device-mounting support member 501 of the sixth embodiment in that, in place of the coupling portion 526, a first arm portion 541a, which is a rigid plate-like member, is employed to couple the first contact portion 511 and the second contact portion 512 to each other, and a second arm portion 541b is employed to couple the first arm portion 541a, at a portion closer to the second contact portion 512, to the third contact portion 513.

The second arm portion 541b is attached so as to be rotatable about a rotation axis 541c, which is provided to the first arm portion 541a and perpendicular to the paper plane of FIG. 20. Further, a torsion spring 541d serving as a spring portion around the rotation axis 541c is provided between the first arm portion 541a and the second arm portion 541b, and one end of an arm of the torsion spring 541d is latched onto the first arm portion 541a while the other end thereof is latched onto the second arm portion 541b. With this configuration, when the third contact portion 513 is opened in a direction of drawing apart from the first arm portion 541a, that is, in the inside direction, so as to clamp the temple 520, a force $F_4$ is generated due to a torsion moment about the rotation axis 541c of the torsion spring 541d, which causes the third contact portion 513 to abut to a surface on the inside of the temple 520 so as to exert force in the outside direction. In this manner, the device-mounting support member 501 is supported by the temple 520. The rest of the configuration and the effects thereof are similar to those of the sixth embodiment, and therefore the same constituent elements are denoted by the same reference symbols and the description thereof is omitted.

According to this embodiment, similarly to the fifth embodiment, the device-mounting support member 501 can be attached with ease without getting in the way when the eyeglasses are worn and can be fixed to the eyeglass temple excellently without impairing the appearance. Further, the coupling portion 541 includes the rigid first arm portion 541a and the second arm portion 541b, and the spring portion is formed of the torsion spring 541d around the rotation axis 541c. The first arm portion 541a and the second arm portion 541b are not elastic members, and hence the first arm portion 541a and the second arm portion 541b can be prevented from being twisted due to a spring force exerted by the torsion spring for clamping the temple 520. Therefore, the upper side or the lower side is prevented from opening between the first contact portion 511 and the third contact portion 513 and between the second contact portion 512 and the third contact portion 513, and thus the device-mounting support member 501 can be prevented from falling off from the temple 520.

Tenth Embodiment

Figure 21A:
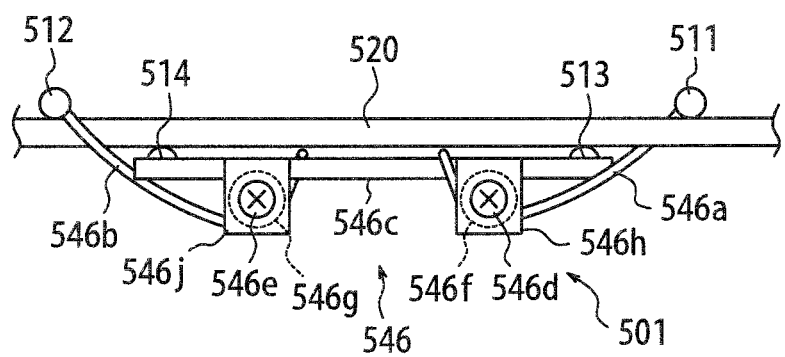
FIGS. 21A and 21B are schematic diagrams for illustrating a structure of a device-mounting support member according to a tenth embodiment of the present invention.
Figure 21B:
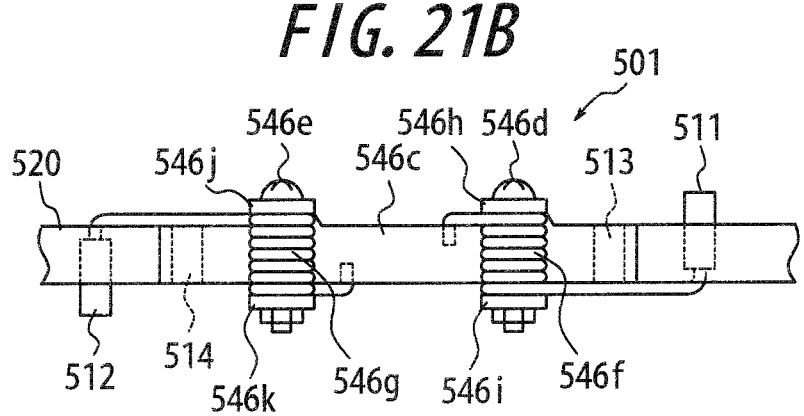

FIGS. 21A and 21B are schematic diagrams for illustrating a structure of a device-mounting support member according to a tenth embodiment of the present invention, in which: FIG. 21A is a top view of the support member attached to an eyeglass frame; and FIG. 21B is a side view thereof.

The device-mounting support member 501 according to this embodiment includes: the first contact portion 511; the second contact portion 512; the third contact portion 513; a fourth contact portion 514; a coupling portion 546; and a device attachment portion (not shown).

The first contact portion 511, the second contact portion 512, the third contact portion 513, and the fourth contact portion 514 each are a elastic member to be attached to the temple 520, and are arranged from before backward in order of the first contact portion 511, the third contact portion 513, the fourth contact portion 514, and the second contact portion 512, in a direction along the temple 520 when attached to eyeglasses. Further, the first contact portion 511 and the second contact portion 512 abut to the temple 520 from the inside of the temple, and the third contact portion 513 and the fourth contact portion 514 abut to the temple 520 from the outside of the temple.

The coupling portion 546 is configured by including: a first arm portion 546a; a second arm portion 546b; a base plate 546c; central axes 546d and 546e; and torsion springs 546f and 546g. The base plate 546c is a plate-like member extending along the temple 520 when attached eyeglasses. The device attachment portion (not shown) is fixed to the base plate 546c. Further, the base plate 546c has the third contact portion 513 and the fourth contact portion 514 formed thereon in this order in the inside direction from the front to the inside direction when attached to eyeglasses.

Further, protruding pieces 546h, 546i and protruding pieces 546j, 546k are provided as being opposed to each other at two points above and below on the outside of the base plate 546c, so as to hold the central axes 546d, 546e, respectively, when attached to eyeglasses. The protruding pieces 546h, 546i, 546j, 546k each have, in the central part thereof, a hole to pass through the central axes 546d and 546e. The central axes 546d and 546e each employ a threaded shaft of a screw, and the torsion spring 546f is arranged between the protruding pieces 546h and 546i with the screw of the central axis 546d being passed through the spring portion thereof, so as to be fixed using a nut.

One arm of the torsion spring 546f is latched onto the base plate 546c while the other arm thereof, namely, the first arm portion 546a is coupled at the leading end thereof to the first contact portion 511. Similarly, the torsion spring 546g is arranged between the protruding pieces 546j and 546k with the screw of the central axis 546e being passed through the spring portion thereof, so as to be fixed using a nut. One arm of the torsion spring 546g is latched onto the base plate 546c while the other arm thereof, namely, the second arm portion 546b is coupled at the leading end thereof to the second contact portion 512. With this configuration, the first contact portion 511 and the second contact portion 512 exert forces to the outside on the side surface on the inside of the temple 520. As illustrated in FIG. 21B, the first arm portion 546a and the second arm portion 546b are arranged, along the temple 520, so as to extend on either one of the upper side and the lower side of the temple 520 so as to be arranged on different sides from each other.

With the above-mentioned configuration, when attaching the device-mounting support member 501 to the temple 520, the first contact portion 511 and the second contact portion 512 are pushed out to the inside with respect to the base plate 546c, so as to clamp the temple 520 between the first contact portion 511 and the third contact portion 513 and between the second contact portion 512 and the fourth contact portion 514. In this manner, the device-mounting support member 501 is supported by the temple 520 as illustrated in FIGS. 21A and 21B. Therefore, a mobile device such as HMD and a camera can be stably supported on the device attachment portion.

According to this embodiment, when attached to the temple 520, the third contact portion 513 and the fourth contact portion 514 are arranged, in the direction along the temple 520, between the first contact portion 511 and the second contact portion 512, and the coupling portion 546 has the spring portions 546f and 546g formed of torsion springs. With the aid of the spring property of the spring portions 545f and 546g, the first contact portion 511 and the second contact portion 512, and the third contact portion 513 and the fourth contact portion 514 are configured to elastically abut to the side surfaces of the temple, as the first contact portion 511 and the second contact portion 512 being arranged on an opposite side to the third contact portion 513 and the fourth contact portion 514 across the temple, so that the device-mounting support member 501 can be attached with ease without getting in the way when the eyeglasses are worn and can be excellently fixed to the eyeglasses 521 without impairing the appearance of the eyeglasses 521.

Further, in this embodiment, the first arm portion 546a and the second arm portion 546b are arranged so as to straddle either above or below the temple 520 so as to be arranged on different sides from each other when mounted on a head, so as to prevent the device-mounting support member 501 from being displaced in any one of upward and downward directions with respect to the temple 520 to fall off the temple 520.

Eleventh Embodiment

Figure 22A:
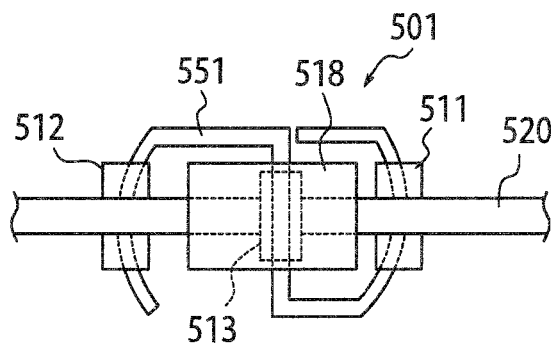
FIGS. 22A to 22C are schematic diagrams for illustrating a structure of a device-mounting support member according to an eleventh embodiment of the present invention.
Figure 22B:
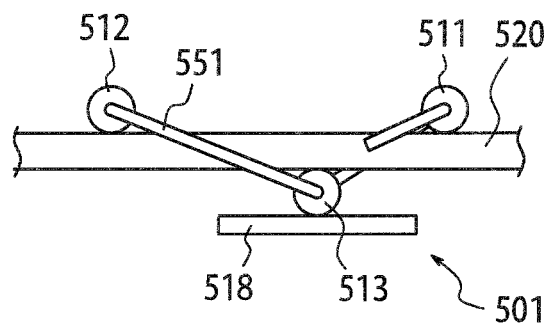
Figure 22C:
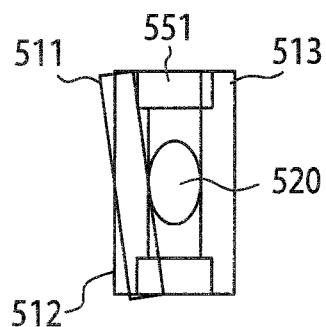

FIGS. 22A to 22C are schematic diagrams for illustrating a structure of a device-mounting support member according to an eleventh embodiment of the present invention, in which: FIG. 22A is a side view thereof when attached to a temple; FIG. 22B is a top view thereof; and FIG. 22C is a view thereof viewed forward from behind the temple.

The device-mounting support member 501 according to this embodiment is configured by including: the first contact portion 511; the second contact portion 512; the third contact portion 513; a coupling portion 551; and the device attachment portion 518. The first contact portion 511, the second contact portion 512, and the third contact portion 513 are cylindrical members each having a central axis extending in the vertical direction when attached to eyeglasses. The contact portions each have a portion to abut to a temple of eyeglasses when attached to eyeglasses, with a surface being formed of an elastic member. Further, the third contact portion 513 is arranged between the first contact portion 511 and the second contact portion 512, and the first contact portion 511, the third contact portion 513, and the second contact portion 512 are linearly arranged in this order.

The coupling portion 551 is a plate-like member or a bar-like member having a spring property, which is in an inverse S-shape (or S-shape) lying on its side when viewed laterally, as illustrated in FIG. 22A, as being attached to eyeglasses. The coupling portion 551 intersects with the temple 520 at three points so as to clamp the temple 520, and the first contact portion 511, the third contact portion 513, and the second contact portion 512 are arranged in order at the three points of intersection. Specifically, the coupling portion 551 penetrates the inside of each of the first to third contact portions 511, 512, and 513.

Further, the device attachment portion 518 is fixed in the vicinity of the third contact portion 513 as illustrated in FIG. 22B.

With the above-mentioned configuration, when attaching the device-mounting support member 501 to the eyeglasses 521, the first contact portion 511 is pulled up from below to be hooked onto the inside of the temple and the second contact portion 512 is hooked onto the inside of the temple across the upper side of the temple with the third contact portion 513 being pressed against the outside of the temple, to thereby clamp the temple 520. In this case, the coupling portion 551 couples between the first contact portion 511 and the third contact portion 513 across the lower side of the temple 520 while couples between the second contact portion 512 and the third contact portion 513 across the upper side of the temple 520. With this configuration, with the aid of the spring force of the coupling portion 551, the first contact portion 511 and the second contact portion 512 each exert a force in the outside direction to the side surface on the inside of the temple 520. Further, the third contact portion 513 exerts a force in the inside direction onto the side surface on the outside of the temple 520. As a result, the device-mounting support member 501 can be fixed to the temple 520.

Further, as illustrated in FIG. 22C, the device-mounting support member 501 clamps the temple 520 with the first contact portion 511 being tilted upward and the second contact portion 512 being tilted downward due to the spring force of the coupling portion 551. Accordingly, the device-mounting support member 501 can be prevented from being displaced in any one of upward and downward directions with respect to the temple 520 to fall off the temple 520.

Further, in this embodiment, the first to third contact portions 511, 512, 513, which are arranged along portions where the coupling portion 551 crosses the temple 520, can be made relatively long in the vertical direction. Accordingly, the device-mounting support member 501 can be moved for positional arrangement across a relatively wide range in the vertical direction with respect to the temple 520. Further, the device-mounting support member 501 can be at an angle with the temple 520 when fixed thereto.

According to this embodiment, similarly to the fifth embodiment, the device-mounting support member 501 can be attached with ease without getting in the way when the eyeglasses are worn and can be fixed to the temple excellently without impairing the appearance. Further, the coupling portion 551 is configured to straddle either above or below the temple 520 when coupling the contact portions to one another so as to be arranged on different sides between the first contact portion 511 and the third contact portion 513 and between the second contact portion 512 and the third contact portion 513, to thereby obtain the device-mounting support member which is unlikely to cause the temple 520 to fall off and also capable of being fixed to the temple at an angle therewith.

Further, the coupling portion 551 is formed only of a member in a simple S-shape, which can be configured lightweight and also manufactured with ease.

In this embodiment, the coupling portion 551 is configured to be arranged below the temple 520 between the first contact portion 511 and the third contact portion 513 and arranged above the temple 520 between the second contact portion 512 and the third contact portion 513. However, on the contrary, the coupling portion 551 may also be configured to be arranged above the temple 520 between the first contact portion 511 and the third contact portion 513 and arranged below the temple 520 between the second contact portion 512 and the third contact portion 513.

Twelfth Embodiment

Figure 23A:
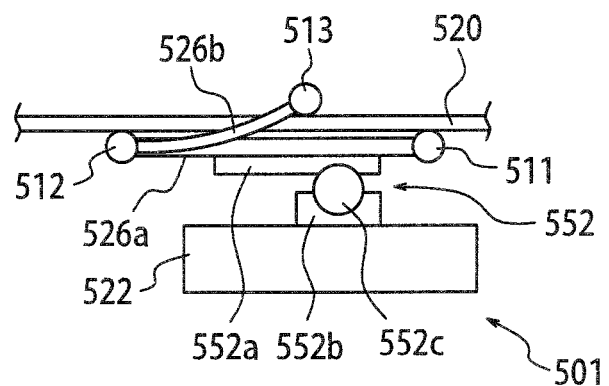
FIGS. 23A and 23B are schematic diagrams for illustrating a structure of a device-mounting support member according to a twelfth embodiment of the present invention.
Figure 23B:
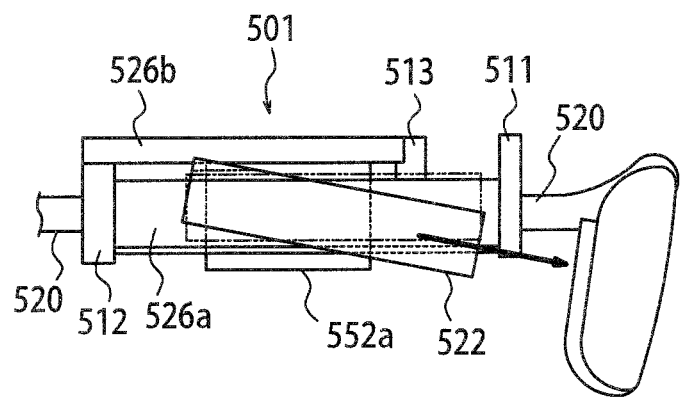

FIGS. 23A and 23B are schematic diagrams for illustrating a structure of a device-mounting support member according to a twelfth embodiment of the present invention, in which: FIG. 23A is a top view of the device-mounting support member attached to eyeglasses; and FIG. 23B is a side view thereof.

The device-mounting support member 501 of this embodiment is different from the device-mounting support member of the sixth embodiment, in that, in place of the device attachment portion 518, a device-attachment mechanism 552 including a rotation mechanism is provided. The device-attachment mechanism 552 has a base plate portion 552a in a plate-like shape attached to the first arm portion, an attachment portion 552b having an attachment for HMD or a camera, and a ball joint 552c serving as an angle adjustment mechanism for coupling the base plate portion 552a and the attachment portion 552b in a mutually turnable manner. The rest of the configuration is similar to that of the sixth embodiment, and hence the same constituent elements are denoted by the same reference symbols and the description thereof is omitted.

As configured as described above, similarly to the fifth embodiment, the device-mounting support member 501 can be attached with ease without getting in the way when the eyeglasses are worn and can be fixed to the temple excellently without impairing the appearance. In addition, a device 522 such as HMD or a camera can be attached to the attachment portion 552b and rotated with respect to the base plate portion 552a via the ball joint 552c, so that the orientation (attachment posture) of the device 522 can be freely adjusted, as illustrated in FIG. 23B, irrespective of the angle of the temple 520.

It should be noted that the device-attachment portion is not limited to the one with the above-mentioned angle adjustment mechanism, and may also be configured to have a flexible member which is coupled, at one end thereof, to the base plate portion 522a and has a device fixed thereto at the other end thereof. With this configuration, the attachment posture of the device can be adjusted through the deformation of the flexible member.

Further, a slide mechanism in the anteroposterior direction or in the vertical direction may be provided between the base plate portion 552a and the attachment portion 552b, so that a device to be fixed to the attachment portion 552b can be adjusted in position in the anteroposterior direction or in the vertical direction.

Thirteenth Embodiment

Figure 24A:
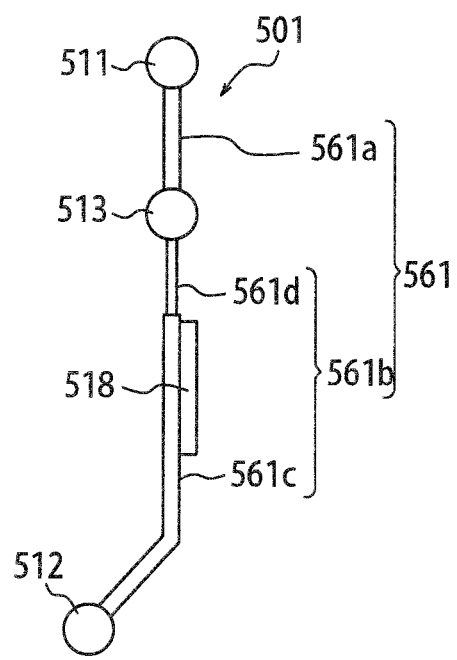
FIGS. 24A and 24B are schematic diagrams for illustrating a structure of a device-mounting support member according to a thirteenth embodiment of the present invention.
Figure 24B:
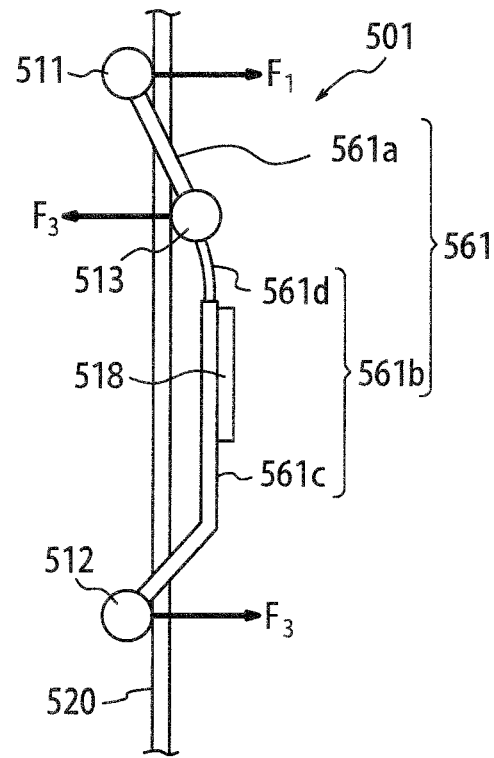

FIGS. 24A and 24B are schematic diagrams for illustrating a structure of a device-mounting support member according to a thirteenth embodiment of the present invention, in which: FIG. 24A is a top view of the device-mounting support member unattached to eyeglasses; and FIG. 24B is a top view of the device-mounting support member attached to a temple.

The device-mounting support member 501 of this embodiment is different from the device-mounting support member of the fifth embodiment in that the rigid portion 516c is not provided, the first arm portion 516a is configured as a rigid first arm portion 561a, the second arm portion 516b is configured as a second arm portion 561b formed of a rigid portion 561c and a spring portion 561d, and the device attachment portion 518 is fixed to the rigid portion 561c of the second arm portion 561b, rather than in the vicinity of the third contact portion 513. Here, the first arm portion 561a is shorter than the second arm portion 561b, and the first arm portion 561a is preferably shorter than one second the length of the second arm portion 561b. Further, the spring portion 561d of the second arm portion 561b is provided adjacent to the third contact portion 513. Further, the rigid portion 561c of the second arm portion 561b is bent in the inside direction in the vicinity of the second contact portion 512, when attached to eyeglasses. The rest of the configuration is similar to the fifth embodiment, and hence the same constituent elements are denoted by the same reference symbols and the description thereof is omitted.

With the above-mentioned configuration, when attaching the device-mounting support member to the temple 520, the first arm portion 561a is attached to the temple 520 so as to straddle the temple 520 forward from behind from the inside to the outside, between the first contact portion 511 and the third contact portion 513, and the second contact portion 512 is moved inside against the spring force exerted by the spring portion 561d so as to be latched onto the temple 520.

According to this embodiment, similarly to the fifth embodiment, the device-mounting support member 501 can be attached with ease without getting in the way when the eyeglasses are worn and can be fixed to an eyeglass temple excellently without impairing the appearance. Further, when attached to the temple 520, the first coupling portion 561a is shorter than the second coupling portion 561b in length in the direction along the temple 520, and the spring portion 561d is provided in the vicinity of the third contact portion 513 of the second coupling portion 561b, so that the device-mounting support member 501 can be attached, using leverage, by hooking the second contact portion 512 onto the temple 520 with a relatively weak force, and can be tightly fixed to the temple 520.

Fourteenth Embodiment

Figure 25A:
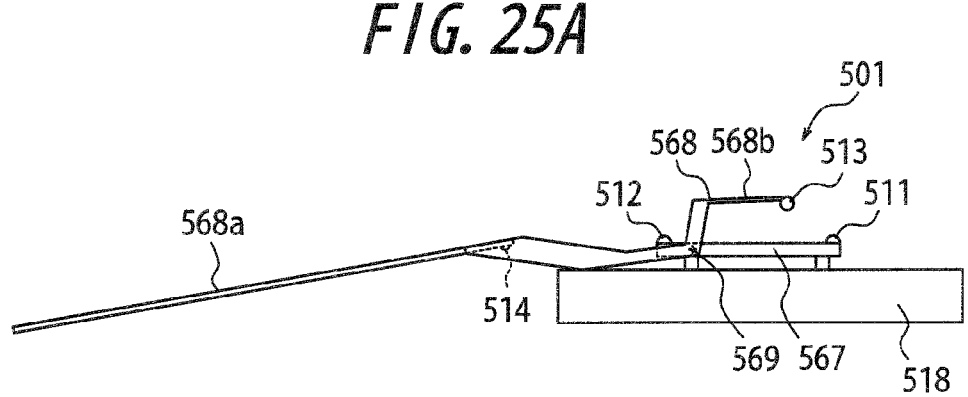
FIGS. 25A to 25C are schematic diagrams for illustrating a structure of a device-mounting support member according to a fourteenth embodiment of the present invention.
Figure 25B:
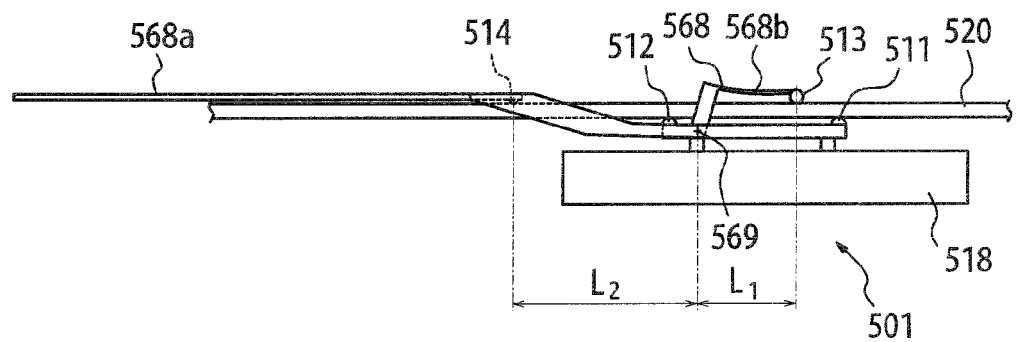
Figure 25C:
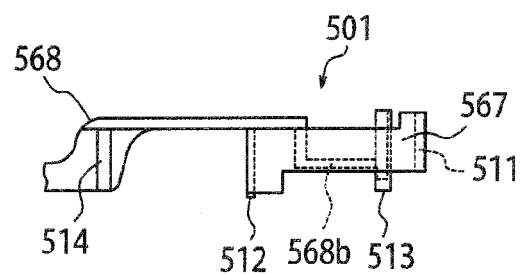

FIGS. 25A to 25C are schematic diagrams for illustrating a structure of a device-mounting support member according to a fourteenth embodiment of the present invention, in which: FIG. 25A is a top view of the device-mounting support member unattached to eyeglasses; FIG. 25B is a top view of the device-mounting support member attached to an eyeglass frame; and FIG. 25C is a side view of a main part thereof.

The device-mounting support member 501 is configured by including: the first to fourth contact portions 511, 512, 513, 514; a first coupling member 567; a second coupling member 568; and the device attachment portion 518.

The first coupling member 567 is a rigid plate-shaped member that extends in a direction along the temple 520 on the outside of the temple 520, when attached to the temple 520. The first coupling member 567 has, on both ends thereof in a direction along the temple 520, the first contact portion 511 and the second contact portion 512 formed in order from the front so as to protrude toward the temple 520. The first contact portion 511 and the second contact portion 512 are each formed of an elastic members in a substantially semicircular column shape elongated in the vertical direction. Further, the device attachment portion 518 is fixed to the first coupling member 567 on a surface on a side (outside) opposite to the temple side.

The second coupling member 568 is coupled, via the first coupling member 567 and a rotary coupling member 569, so as to be rotatable around a rotation shaft extending in the vertical direction (direction vertical to the paper plane of FIGS. 25A and 25B). For example, the second coupling member 568 is rotatably pinned onto an upper surface of the first coupling member 567.

The second coupling member 568 is an elongated plate-like member that straddles above the temple 520 in front and back of the rotary coupling portion 569 and extends along the temple 520 anteriorly and posteriorly thereof. The third contact portion 513 is coupled to the anterior end of the second coupling member 568. The third contact portion 513 is an elastic member protruding outward so as to abut to the temple 520 from the inside when attached to the temple 520.

Further, the second coupling member 568a is formed, at the posterior end thereof, as an ear hook portion 568a which extends to the ear of a wearer along the eyeglasses. The ear hook portion 568a is hooked onto the ear of the wearer, so that the device-mounting support member 501 is fixed at two points, namely, at the eyeglasses and at the wearer, which allows stable attachment. In particular, with the aid of the temple 520 and the contact portions 511 to 514, the attachment position with respect to the wearer can be defined, while the ear hook portion 568 prevents the device-mounting support member 501 from falling off and rotating with respect to the eyeglass temple 520. Further, the second coupling member 568a is also formed as a spring portion 568b having a spring property at a portion to the third contact portion 513 from the point where the second coupling member 568 straddles the temple 520 anteriorly to the rotary coupling portion 569.

Further, at a position immediately after the point where the second coupling member 568 straddles posteriorly the temple 520, a fourth contact portion 514 is formed so as to abut to the temple 520 from the inside when attached to the temple 520. The fourth contact portion 514 is formed of the same material and in the same shape as the first and second contact portions 511, 512.

As illustrated in FIGS. 25B, 25C, the first to fourth contact portions 511, 512, 513, 514 are arranged, when attached to the temple 520, in order of the first contact portion 511, the third contact portion 513, the second contact portion 512, and the fourth contact portion 514, from before backward. At this time, a length ($L_1$) between the third contact portion 513 and the rotary coupling portion 569 in a direction along the temple 520 is shorter than a length ($L_2$) between the fourth contact portion 514 and the rotary coupling portion 569 in the direction along the temple 520.

Figure 26A:
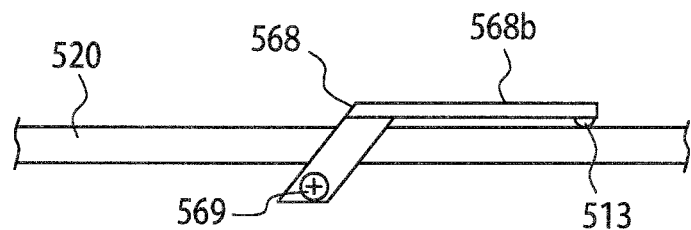
FIGS. 26A to 26D are views illustrating a second coupling member in part between a rotary coupling portion of a second coupling portion and a third contact portion, of the device-mounting support member of FIG. 25.
Figure 26B:
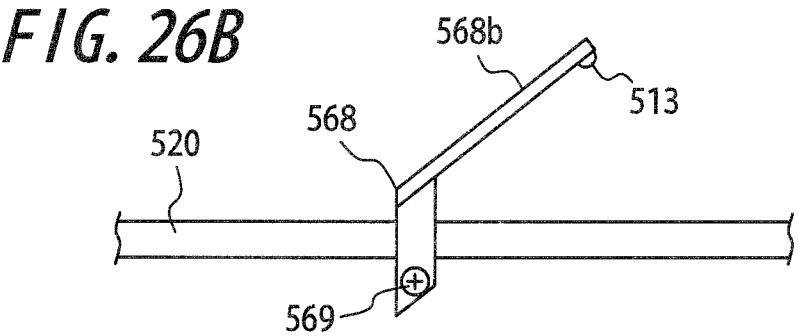
Figure 26C:
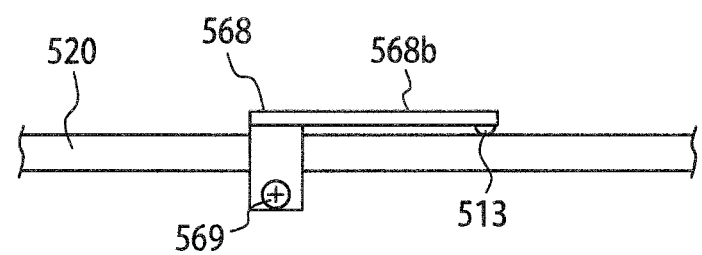
Figure 26D:
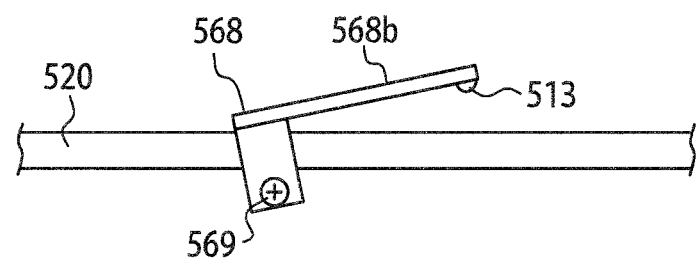

FIGS. 26A to 26D are views illustrating the second coupling member 568 in part between the rotary coupling portion of and the third contact portion, of the device-mounting support member of FIG. 25. FIG. 26A is a top view illustrating this embodiment attached to a temple, FIG. 26B is a top view illustrating this embodiment detached from the temple, FIG. 26C is a top view of a comparative example attached a temple, and FIG. 26D is a top view illustrating the comparative example detached from the temple.

In this embodiment, as illustrated in FIG. 26A, when attached to the temple 520, the second coupling member 568 intersects with the temple 520 (straddles the temple 520) as being tilted forward, between the rotary coupling member 569 and the third contact portion 513. This configuration allows the second coupling member 568 to rotate in a wide circle about the rotary coupling portion 569, as illustrated in FIG. 26B, without interfering with the temple 520, before and after being attached to the temple 520. Further, the second coupling member 568 intersects with a temple across a portion that is long enough to be adapted to a thicker temple.

In contrast, as illustrated in FIG. 26C as a comparative example, when the second coupling member 568 intersects with the temple 520 in a direction substantially orthogonal to the temple 520, the second coupling member 568 interferes with the temple 520, as illustrated in FIG. 26D, before and after being attached to the temple 520, and hence is not capable of rotating in a wide circle about the rotary coupling portion 569. Further, in this case, the second coupling member 568 is difficult to be adapted to a temple of different thickness.

With the above-mentioned configuration, similarly to the fifth embodiment, the device-mounting support member 501 can be attached with ease without getting in the way when the eyeglasses are worn and can be fixed to the eyeglass temple excellently without impairing the appearance. Further, when attaching the device-mounting support member 501 to the temple 520, first, the temple 520 is clamped between the first contact portion 511 and the third contact portion 513 and between the second contact portion 512 and the third contact portion 513, and then the ear hook portion 568a of the second coupling member 568 is pulled to the inside of the temple 520 against the spring force exerted by the spring portion 568b so that the fourth contact portion 514 is latched onto a surface on the inside of the temple 520 so as to be abutted thereto. A length ($L_1$) from the third contact portion 513 to the rotary coupling portion 569 is shorter than a length ($L_2$) from the fourth contact portion 514 to the rotary coupling portion 569, so that the fourth contact portion 514 can be fixed, using leverage, to the temple 520 with a relatively weak force.

Further, the second coupling member 568 is configured to intersect with the temple 520 as being tilted forward between the rotary coupling portion 569 and the third contact portion 513, as being attached to the temple 520 when viewed vertically, so that the second coupling member 568 is unlikely to interfere with the temple 520, and hence can be adapted with ease to a temple of different thickness.

In this embodiment, the second coupling member 568 is configured to straddle the temple 520 from above. However, the second coupling member 568 may also be configured to straddle the temple 520 from below.

It should be noted that the present invention is not limited only to the above-mentioned embodiments, and may be subjected to various modifications and alternations. For example, in the fifth to fourteenth embodiment, each contact portion is formed in a cylindrical shape, but contact portions in various shapes can be employed without being limited to the cylindrical shape. Further, in each embodiment described above illustrates a configuration where the device is attached to a temple on the right side of eyeglasses. However, it is needless to say that the present invention can also be applied similarly to a temple on the left side.

DESCRIPTION OF SYMBOLS 100 device-mounting support member
101 eyeglass attachment portion
101a first pressing portion
102 support frame portion
103 head abutment portion
103a pivot point portion
104 support bridge portion
200 the device-mounting support member
201 eyeglass attachment portion
201a first pressing portion
202 support frame portion
203 head abutment portion
203a second abutment portion
204 support bridge portion
400 the device-mounting support member
401 eyeglass attachment portion
401a pressing portion
402 support frame portion
403 ear hook portion
404 support bridge portion
501 the device-mounting support member
511 first contact portion
512 second contact portion
513 third contact portion
514 fourth contact portion
516 coupling portion
516a first arm portion
516b second arm portion
516c rigid portion
518 device attachment portion
520 eyeglass temple
521 eyeglasses
522 device
526 coupling portion
526a first arm portion
526b second arm portion
531 coupling portion
531a first arm portion
531b second arm portion
532 canopy portion
536 coupling portion
536a first arm portion
536b second arm portion
541 coupling portion
541a first arm portion
541b second arm portion
541c rotation axis
541d torsion spring
546 coupling portion
546a first arm portion
546b second arm portion
546c base plate
546d, 46e rotation shaft
546f, 46g torsion spring
552 device attachment mechanism
552a base plate portion
552b attachment portion
552c ball joint
561 coupling portion
561a first arm portion
561b second arm portion
561c rigid portion
561d spring portion
567 first coupling member
568 second coupling member
568a ear hook portion
569 rotary coupling portion
$F_1, F_2, F_3, F_4$ force
$L_1, L_2$ distance

The invention claimed is:

1. A device-mounting support member for mounting a wearable device onto an eyeglass frame, comprising:
  an eyeglass attachment portion having a first pressing portion to be pressed against a temple of the eyeglass frame;
  a support frame portion to be attached with the wearable device, the support frame portion extending from the eyeglass attachment portion substantially parallel to the temple of the eyeglass frame; and
  a head abutment portion which is coupled to the support frame portion and to be abutted to a head of a wearer, wherein
  the support frame portion is arranged on the outside of the temple of the eyeglass frame;
  the head abutment portion is arranged on the inside of the temple of the eyeglass frame and prevents rotation about the temple; and
  the support frame portion and the head abutment portion are coupled to each other via a support bridge portion that straddles the temple of the eyeglass frame.

2. The device-mounting support member according to claim 1,
  wherein the head abutment portion has a pivot point portion that comes into contact with the temple of the eyeglass frame; and
  the head abutment portion is pushed out to the outside by the head of the wearer, when the eyeglass frame attached with the support member is worn by the wearer, so that the first pressing portion is pressed against the temple of the eyeglass frame from the outside to the inside of the temple with the pivot point portion serving as a pivot.

3. The device-mounting support member according to claim 2, wherein the first pressing portion and/or the pivot point portion are in a shape that follows a side surface shape of the temple of the eyeglass frame.

4. The device-mounting support member according to claim 1,
  wherein the first pressing portion of the eyeglass attachment portion is arranged on the inside of the temple of the eyeglass frame;
  the head abutment portion has a second pressing portion to be pressed against the inside of the temple of the eyeglass frame;
  the eyeglass attachment portion further has an outside attachment portion coupled to the support frame portion and arranged on the outside of the temple of the eyeglass frame and an attachment bridge portion for coupling the first pressing portion and the outside attachment portion across the temple of the eyeglass frame; and
  the support frame portion exerts an elastic force, when the support member is attached to the eyeglass frame, so as to cause the first pressing portion to be pressed against the temple from the inside to the outside of the temple of the eyeglass frame, and the second pressing portion to be pressed against the temple from the inside to the outside of the temple of the eyeglass frame.

5. The device-mounting support member according to claim 4, wherein the first pressing portion and/or the second pressing portion are in a shape that follows a side surface shape of the temple of the eyeglass frame.

6. The device-mounting support member according to claim 4, wherein the attachment bridge portion straddles above the temple of the eyeglass frame.

7. The device-mounting support member according to claim 4, wherein the attachment bridge portion directly couples the first pressing portion and the outside attachment portion to each other across the temple of the eyeglass frame.

8. The device-mounting support member according to claim 1,
- wherein the first pressing portion of the eyeglass attachment portion is arranged on the inside of the temple of the eyeglass frame;
- the head abutment portion has a second pressing portion to be pressed against the inside of the temple of the eyeglass frame;
- the eyeglass attachment portion further has an outside attachment portion coupled to the support frame portion and arranged on the outside of the temple of the eyeglass frame, and an attachment bridge portion for coupling, across the temple of the eyeglass frame, the first pressing portion to one of the outside attachment portion and the support frame portion; and
- the attachment bridge portion exerts an elastic force, when the support member is attached to the eyeglass frame, so as to cause the first pressing portion to be pressed against the temple from the inside to the outside of the temple of the eyeglass frame.

9. The device-mounting support member according to claim 1, further comprising a movement prevention portion for preventing the device-mounting support member from moving in one of a vertical direction and a lateral direction when the support member is attached to the eyeglass frame.

10. The device-mounting support member according to claim 1, wherein the head abutment portion has a leading end portion curved to the inside of the temple of the eyeglass frame, the leading end portion being subjected to one of branching and bending in a plurality of directions along the head of the wearer.

11. The device-mounting support member according to claim 1, wherein the support bridge portion straddles above the temple of the eyeglass frame.

12. The device-mounting support member according to claim 1, wherein the support frame portion has coupling means for attaching the wearable device so that the wearable device is made adjustable in posture thereof.

13. The device-mounting support member according to claim 12, wherein the coupling means has a mechanism capable of rotating the wearable device in at least one of a pitch direction and a roll direction with respect to the extending direction of the temple of the eyeglass frame.

14. The device-mounting support member according to claim 1, wherein the head abutment portion is an ear hook portion to be hooked onto an ear of the wearer.

15. The device-mounting support member according to claim 14, wherein the support frame portion is arranged between the eyeglass attachment portion and the ear hook portion.

16. The device-mounting support member according to claim 14,
- wherein the first pressing portion of the eyeglass attachment portion is arranged on the inside of the temple of the eyeglass frame;
- the eyeglass attachment portion has an outside attachment portion coupled to the support frame portion and arranged on the outside of the temple of the eyeglass frame and an attachment bridge portion for coupling the first pressing portion to one of the outside attachment portion and the support frame portion; and
- the support frame portion is arranged on the outside of the temple of the eyeglass frame.

17. The device-mounting support member according to claim 16, wherein the support frame portion exerts an elastic force, when the support member is attached to the eyeglass frame, so as to cause the first pressing portion to be pressed against the temple from the inside to the outside of the temple of the eyeglass frame and the ear hook portion to be pressed against the temple from the inside to the outside of the temple of the eyeglass frame.

* * * * *